US010728780B2

United States Patent
Keskitalo et al.

(10) Patent No.: US 10,728,780 B2
(45) Date of Patent: Jul. 28, 2020

(54) MONITORING IN WIRELESS BACKHAUL NETWORKS

(71) Applicant: NOKIA TECHNOLOGIES OY, Espoo (FI)

(72) Inventors: Ilkka Antero Keskitalo, Oulu (FI); Esa Tapani Tiirola, Kempele (FI); Juha Sakari Korhonen, Espoo (FI); Juha Pekka Karjalainen, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/377,393

(22) Filed: Apr. 8, 2019

(65) Prior Publication Data

US 2019/0313269 A1    Oct. 10, 2019

(30) Foreign Application Priority Data

Apr. 6, 2018 (FI) .................................... 20185326

(51) Int. Cl.
*H04W 84/04* (2009.01)
*H04B 7/155* (2006.01)
(Continued)

(52) U.S. Cl.
CPC .......... *H04W 24/08* (2013.01); *H04W 24/02* (2013.01); *H04W 84/047* (2013.01)

(58) Field of Classification Search
CPC ... H04W 24/08; H04W 24/02; H04W 84/047; H04W 24/10; H04W 40/22;
(Continued)

(56) References Cited

U.S. PATENT DOCUMENTS

2009/0296626 A1    12/2009 Hottinen et al.
2011/0164555 A1    7/2011 Yim et al.
(Continued)

FOREIGN PATENT DOCUMENTS

EP    2 290 839 A1    3/2011
WO    2016135082 A1    9/2016
(Continued)

OTHER PUBLICATIONS

Aug. 1, 2019 Office Action issued in German Application No. 102019108972.7.
(Continued)

*Primary Examiner* — Joseph E Dean, Jr.
(74) *Attorney, Agent, or Firm* — Squire Patton Boggs (US) LLP

(57) ABSTRACT

According to an aspect, there is provided a control node comprising means for performing: maintaining information, in a database, on a plurality of network nodes which are configured to perform wireless backhauling in at least one wireless backhaul network and are in communication with the control node, selecting, based on the information on the plurality of network nodes and according to pre-defined criteria, a first and a second set of network nodes from the plurality of network nodes and transmitting to the first set a first command to transmit a reference signal at one or more first pre-defined time instances and to the second set of network nodes a second command to monitor received signals at said one or more first pre-defined time instances to measure the reference signal.

18 Claims, 12 Drawing Sheets

(51) Int. Cl.
  *H04B 7/26* (2006.01)
  *H04B 7/185* (2006.01)
  *H04L 5/00* (2006.01)
  *H04L 25/02* (2006.01)
  *H04W 72/04* (2009.01)
  *H04W 24/08* (2009.01)
  *H04W 24/02* (2009.01)

(58) Field of Classification Search
  CPC ......... H04W 72/0406; H04W 72/0446; H04W 84/18; H04W 88/04; H04B 7/15542; H04B 7/2606; H04B 7/1851; H04B 7/00; H04B 17/318; H04B 17/327; H04B 17/382; H04L 5/0048; H04L 25/0204
  See application file for complete search history.

(56) References Cited

U.S. PATENT DOCUMENTS

| | | | |
|---|---|---|---|
| 2014/0133428 A1* | 5/2014 | Kazmi | H04L 5/0098 370/329 |
| 2014/0362688 A1* | 12/2014 | Zhang | H04L 41/12 370/230 |
| 2015/0031284 A1 | 1/2015 | Pitakdumrongkija et al. | |
| 2016/0381591 A1 | 12/2016 | Lysejko et al. | |

FOREIGN PATENT DOCUMENTS

| | | |
|---|---|---|
| WO | WO 2017/052569 A1 | 3/2017 |
| WO | WO 2019/101343 A1 | 5/2019 |

OTHER PUBLICATIONS

Search Report dated Jul. 20, 2018 corresponding to Finnish Patent Application No. 20185326.
Search Report 2 dated Oct. 15, 2018 corresponding to Finnish Patent Application No. 20185326.
Office Action dated Jul. 20, 2018 corresponding to Finnish Patent Application No. 20185326.
Office Action dated Oct. 15, 2018 corresponding to Finnish Patent Application No. 20185326.
Stefan Berger et al., "Comparison of Channel Estimation Protocols for Coherent AF Relaying Networks in the Presence of Additive Noise and LO Phase Noise," EURASIP Journal on Wireless Communications and Networking 2010.
AT & T et al., "New SID Proposal: Study on Integrated Access and Backhaul for NR," RP-170821, 8881123GPP TSG RAN Meeting #75, Dubrovnik, Croatia, Mar. 6-9, 2017, 5 pages.

* cited by examiner

MONITORING IN WIRELESS BACKHAUL NETWORKS

TECHNICAL FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The fifth generation cellular systems (5G) aim to improve the throughput by a huge factor (even up to 1000 or more), which provides a multitude of challenges, especially considering the scarcity of spectrum at low frequency bands and the need for supporting a very diverse set of use cases. In order to reach this goal, it is important to exploit the higher frequencies such as millimeter wave frequencies in addition to the more conventional lower frequencies. To meet the demands of 5G systems, a new, globally standardized radio access technology known as New Radio (NR) has been proposed with the first specification released at the end of 2017. One proposed feature of the New Radio technology is the support for Integrated Access and Backhaul (IAB), i.e., wireless backhauling using relaying nodes (RN) enabling flexible and very dense deployment of cells without the need for densifying the transport network proportionately. As deterioration of any wireless backhauling link likely has a negative effect on the service quality of multiple user equipment, it is critical to constantly monitor the signal quality in the current backhauling connections as well as candidate backhauling connections. Thus, a new type of monitoring solution is required.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, exemplary embodiments will be described with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
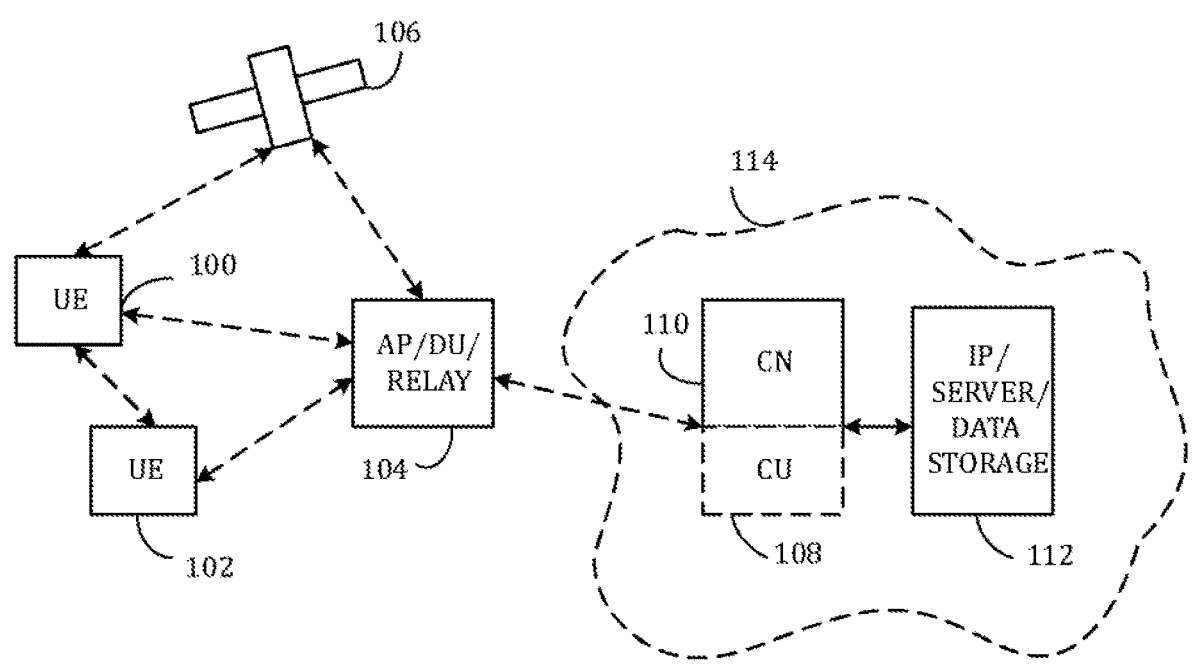
FIGS. 1 to 3 illustrate wireless communication scenarios to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned above, one suggested feature of the future 5G communications systems is the so-called 5G New Radio. 5G New Radio refers to a new global 5G standard for an orthogonal frequency-division multiplexing (OFDM)-based air interface designed to fit the more stringent requirements of the 5G systems (for example, providing different types of services to a huge number of different types of devices operating over a wide frequency spectrum). The 5G New Radio shall be able to allow network deployment with minimized manual efforts and as automated self-configuration as possible. Especially on higher frequency bands the coverage will be an issue and specific capabilities are needed for New Radio to enable easy coverage extension with minimized/none requirements for network (re-)planning in a fast and cost-efficient manner.

One of the features proposed for 5G New Radio in order to reach said requirements is wireless backhauling using relay links. In wireless backhauling, a specific relaying node, RN, (or two or more such relaying nodes) is used to provide wireless backhaul connection (instead of having a wired connection) to a ("donor") base station (equally called a donor access node or a donor node) with fixed connection to the network backhaul. The serving base station(s) will have the overall control of the usage of the radio resources. Further, relay nodes are typically expected to operate with half-duplex constraint, which causes additional restrictions to the radio resource utilization.

The relay links used for wireless backhauling may operate, fully or partly, in the same frequency band using the same radio access technology (RAT) compared to the corresponding access links. This type of backhauling is called inband backhauling. Alternatively, the backhaul and access links may be orthogonal to each other, that is, they may be separated by, for example, having different carrier frequencies, frequency bands, and/or even different RATs. This type of backhauling is called out-of-band backhauling. Both types of wireless backhauling are envisioned to be used in 5G systems.

The out-of-band backhauling overcomes or at least alleviates many of the problems commonly associated with self-backhauling such as the difficulties in sharing the common resources between the access and backhauling links in an optimal manner, the interference between access and backhauling links and need for different timing for access and backhauling links at the relay node. However, some problems remain even with the out-of-band backhauling. One such problem is how to organize monitoring of neighboring relay nodes or donor nodes when a large part of the relay nodes is transmitting simultaneously at any given time. Such monitoring is necessary in order to stay up-to-date concerning the available connections for each relay node and further to enable rapid path switching using said available connections to avoid connection breaks due to a radio path blockage and thus improve reliability of the communications system. Following embodiments overcome at least some of said problems.

Figure 2:
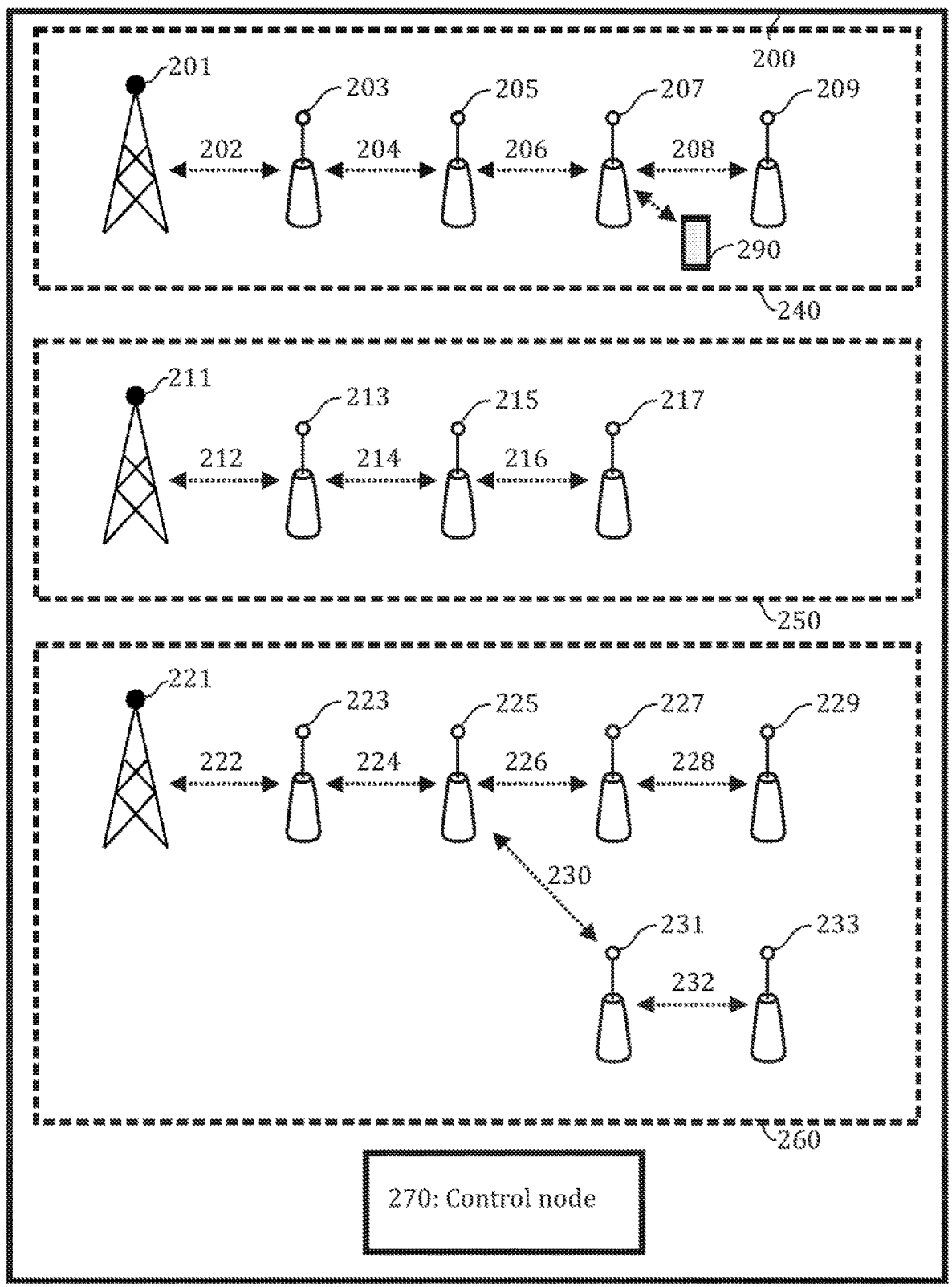

FIG. 2 illustrates another example of a communications system 200 to which some embodiments may be applied. The communications system 200 may be a wireless communication system comprising of one or more wireless backhaul networks 240, 250, 260.

Each wireless backhaul network 240, 250, 260 comprises one or more access nodes 201, 203, 205, 207, 209, 211, 213, 215, 217, 221, 223, 225, 227, 229, 231, 233 each of which may correspond to element 104 of FIG. 1. Specifically, each wireless backhaul network 240, 250, 260 comprises at least one donor (access) node 201, 211, 231 providing a wired backhauling link as well as one or more relay nodes 203, 205, 207, 209, 213, 215, 217, 223, 225, 227, 229, 231, 233 providing wireless backhauling links 202, 204, 206, 208, 212, 214, 216, 222, 224, 226, 228, 230, 232 to a donor node, possible via other relay nodes. Each access node may provide and control a respective cell or cells (not shown in FIG. 2 for simplicity and clarity). From another point of view, each cell may define a coverage area or a service area of the access node. The cells may comprise, for example, one or more macro cells and/or one or more small cells (micro, femto, or pico cells).

The access nodes 201, 203, 205, 207, 209, 211, 213, 215, 217, 221, 223, 225, 227, 229, 231, 233 may be connected via radio (access) links 291 to one or more terminal devices 290 (only one shown in FIG. 2 for clarity). This link is called an access link. Each terminal device 290 may correspond to either of elements 100, 103 of FIG. 1. Thus, the access nodes may provide one or more terminal devices 290 (user equipment, UEs) with wireless access to other networks such as the Internet, either directly or via a core network.

In contrast to the donor access nodes 201, 211, 221, while one or more terminal devices 290 may be able to establish communication links (access links) 291 with one or more relay nodes 207, the one or more relay nodes 207 may not be able to provide access directly via a wired connection (e.g., using an optical fiber) for said one or more terminal devices 290 to the core network (i.e., enable backhauling). Instead, the relay nodes 203, 205, 207, 209, 213, 215, 217, 223, 225, 227, 229, 231, 233 have to relay the traffic (via backhaul links) to one of the donor access nodes 201, 211, 221 in order to provide said access and possible further access via the core network to other networks such as the Internet for any terminal devices within the cell of a relay node. In other words, the relay nodes 120, 140 need to utilize wireless backhauling.

The wireless backhauling for a given relay node may be achieved with a single backhauling link, for example, using the backhauling links 202, 212, 222 in the case of the relay nodes 203, 213, 223, respectively. On the other hand, in multi-hop deployment scenarios, two or more separate backhauling links or two or more "hops" may be needed in order to provide the access to network services for the terminal device. For example, a relay node may be located in such a location that sufficiently high signal level for a backhauling link may not be achievable, at least in a dependable manner, if only direct backhauling links between the relay node and the donor access nodes are considered. Therefore, the best option for providing access for the terminal device located within the cell of the relay node may be to relay the backhauling traffic via the relay node (acting as serving relay node) to the donor access node using the backhauling links and the radio access link.

The wireless backhauling may be transparent to the terminal device, that is, the terminal device 290 may not be able to distinguish between a donor access node and a relay node. In such case, conventional radio resource management (RRM) operations (e.g., mobility with handovers) may be applied and a single relay node may form one or multiple cells. Transparent operation may also be achieved so that the relay node operates as a transmitter/receiver point (Tx/Rx point, TRP) within a cell of an access node.

The wireless backhauling employed in the wireless backhaul networks 240, 250, 260 may be specifically out-of-band backhauling, that is, wireless backhauling where the backhaul and access links are separated by, for example, having different carrier frequencies, frequency bands, and/or even different RATs (as described above). In some embodiments, self-backhauling may be used in at least one wireless backhaul network 240, 250, 260.

The wireless backhaul networks 240, 250, 260 may correspond to different topologies such as chain (or line) topology, a tree topology or a mesh topology. The top and middle wireless backhaul networks 240, 250 correspond to chain topologies. In a chain topology, each donor node 201, 211 is connected to a single relay node 203, 213 and each relay node 203, 205, 207, 213, 215 excluding the relay nodes 209, 217 forming the end of the chain is connected to two relay nodes (namely, one in upstream direction and the other in downstream direction). Thus, the relay nodes form a chain starting from the donor node 201, 211. The bottom wireless backhaul network 260 corresponds to a tree topology. In a tree topology, each relay node or donor access node may be connected to two or more relay nodes in the downstream direction so that different branches similar to a tree may be formed. However, the tree topology does not allow connecting different branches to each other so as to form loops in the topology. For example, the wireless backhaul network 260 corresponds to a tree with two branches defined by elements 226 to 229 and elements 230 to 233 with the relay node 225 acting as the branching point for the tree. Finally, mesh topology (not shown in FIG. 2) is a general topology for a wireless backhaul network where each node may be connected to any other node. It should be appreciated that FIG. 2 as well as following Figures depicting different topologies are only meant to illustrate the connections between different nodes, that is, not their actual physical locations relative to each other. For example, network nodes in a chain topology are not necessarily arranged along a straight line as is illustrated (mainly for simplicity and clarity) in FIG. 2.

The wireless backhaul networks 240, 250, 260 may correspond to different hierarchy levels. In the following, it is assumed that the top wireless backhaul networks 240 has a higher hierarchy level compared to the middle wireless backhaul networks 250 which in turn has higher hierarchy level compared to the bottom wireless backhaul network 260. The hierarchy level of the tree determines to which extent the communications within a given tree is prioritized over the other trees as will be described in detail in conjunction with following embodiments. In some embodiments, same hierarchy level may be assigned to multiple wireless backhaul networks.

The relay nodes 203, 205, 207, 209, 213, 215, 217, 223, 225, 227, 229, 231, 233 may be configured to take care of the communication with the donor cell (i.e., the donor access node) or another relay cell over the radio interface. Specifically, the relay node may be, for example, configured to establish the backhauling connection and/or monitor the cell/beam(s) of the relay node and re-select the cell/beam(s) if there is a change in the radio connections, i.e., perform beam measurements/selection, cell evaluation and triggering handovers.

Moreover, the relay nodes may be configured to perform all access node functions for serving the terminal devices 290 in the cell of the relay node and connecting to other relay or access nodes. To provide access node functionalities, the relay node may be, for example, configured further to perform relay node cell broadcasting such as transmitting synchronization signals (SSB), CSI-RS or other reference signals, and/or system information (SI), and/or paging, control connections of the terminal devices in the cell of the relay node, act as a serving network node for the following relay node in case of multi-hop relaying (e.g., the access unit acting as a serving network node for the relay node for which no direct backhauling link is available), communicate with the other access nodes and/or relay nodes over non-backhauling interfaces and/or connect to the core network.

For a donor node or an upstream relay node, a downstream relay node may "look" like a terminal device (i.e., UE) while an upstream relay node may "look" like an access node (e.g., gNB) for a downstream relay node. In a multi-hop wireless backhaul scenario as illustrated in FIG. 2, measurement (and/or signaling) opportunities should be provided to the relay nodes 203, 205, 207, 209, 213, 215, 217, 223, 225, 227, 229, 231, 233 as well the donor nodes 201, 211, 221 in order to have up-to-date knowledge about the radio connections for alternative or candidate backhaul links as described in the previous paragraph. To enable said functionality, the donor nodes as well as relay nodes may be controlled by a centralized control node or control unit 270. The control unit 270 may correspond to, be comprised in or connected to a topology manager. Further, the control node may be located in a centralized unit of a cloud based RAN or distributed RAN architecture. Being a logical node, the functions of the control node may be distributed to multiple physical network nodes, or, the functions can be run in a single network node. In some embodiments, the control unit 270 may also be located in a core network. In some embodiments, the control unit 270 may be cloud-based (e.g., located in a core network cloud). How the assigning of measurement opportunities (e.g., time instances for performing measurements or transmitting signals to be measured) may be arranged is discussed in detail in connection with the following embodiments.

Figure 3:
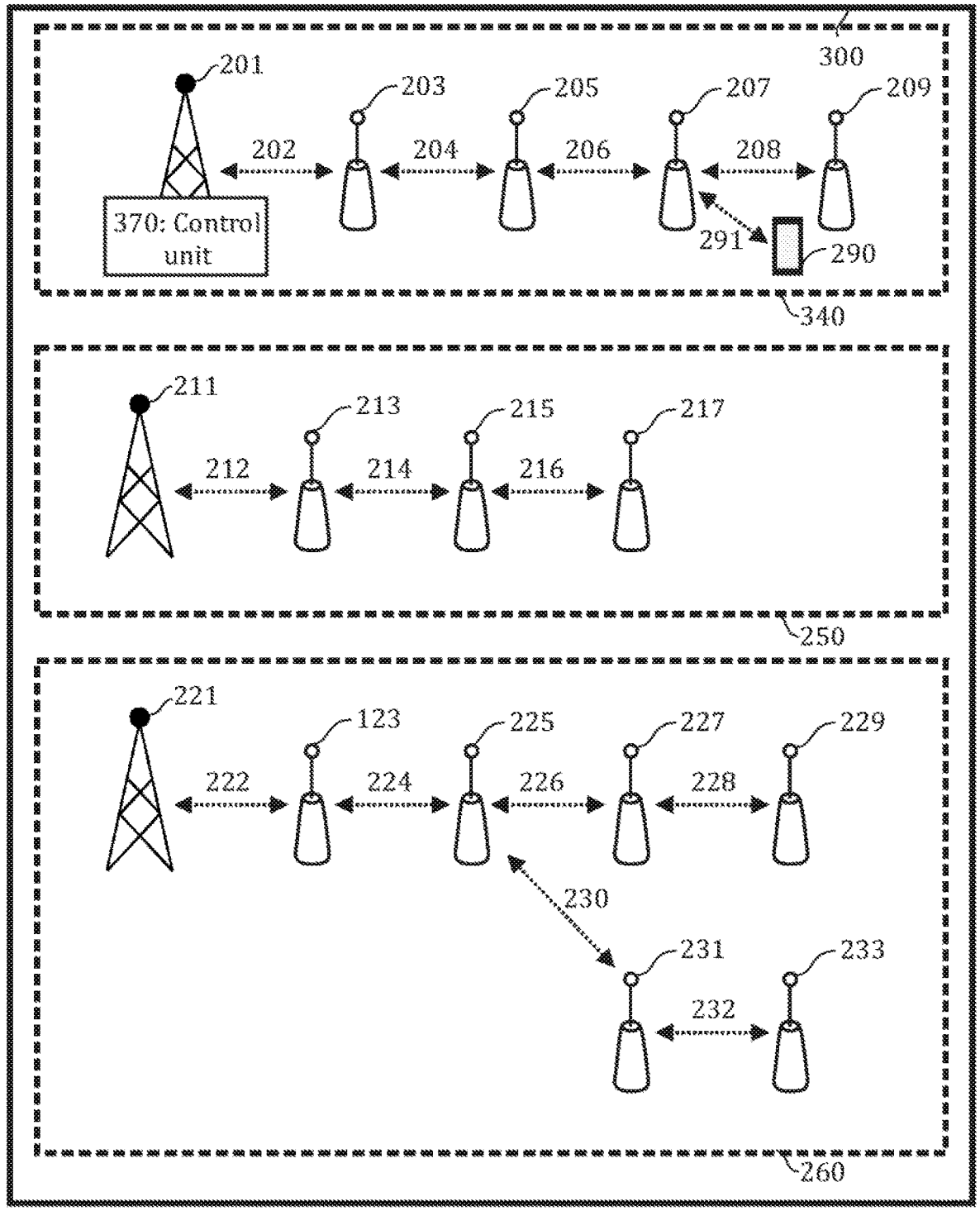

FIG. 3 illustrates an alternative placement for the control unit 370. Namely, FIG. 3 illustrates a communications system 300 according to an embodiment where the control unit 370 is comprised in a wireless backhaul network 340 integrated or connected to a donor node 301. The donor node 301 may be configured to manage using the control unit 370 at least the network nodes within its own wireless backhaul network 340. Moreover, the donor node 301 may be configured to manage one or more wireless backhaul network 250, 260. A combination of the donor node 301 and the control unit 370 may be called a control node. Additionally or alternatively, the control node may be distributed among multiple donor nodes communicating between each other. The control node functions may also be part of the RRM functions with the radio access network. Apart from the placement of the control unit 380, the communications system 300 may be similar to the communications system 200 of FIG. 2.

In some embodiments, the relay nodes may be configured to operate according one or more different Tx/Rx patterns (i.e., transmission/reception time patterns). According to a simple definition, a Tx/Rx pattern for a given network node defines when said network node is able to transmit and when it is able to receive. Commonly, relay nodes utilize time division duplex (TDD), where uplink (or upstream) is separated from downlink (or downstream) by the allocation of different time slots in the same frequency band, with half duplex under which a relay node cannot transmit and receive at the same time at least towards the same direction. In the in-band scenarios access and backhaul may also be separated by means of time division multiplexing and separate time domain resources. Thus, typically in such a half-duplex scenario roughly half of the nodes are transmitting and the other half is receiving over the backhaul (and/or access) links at any given time. This concept is illustrated for the out-of-band backhauling in FIG. 4 for three exemplary backhauling links, namely backhauling links 202, 204, 206 associated with the donor node 201 and the relay nodes 203, 205, 207 as illustrated in FIG. 2 or FIG. 3.

Figure 4:
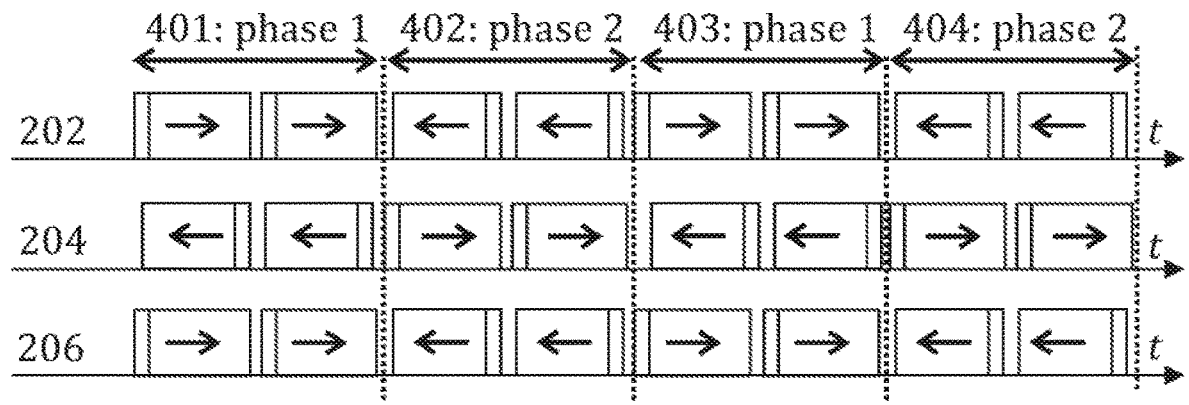
FIG. 4 illustrates examples of Tx/Rx patterns used in some embodiments.

According to FIG. 4, the relay nodes 203, 205, 207 are allowed to transmit at the same time on the upstream and downstream backhaul links (depicted in FIG. 4 with left-facing arrows and right-facing arrows, respectively, inside the blocks depicting slots). This way unused slots on the backhaul connections may be eliminated. According to some embodiments, when hops with odd number counting from the donor node (such as 202, 206, 212, 216 . . . ) are in downstream phase, hops with even number (such as 204, 208, 214 . . . ) are in upstream phase, and vice versa. For instance, during phase 1 (denoted by 401) the relay node 203 is receiving both in downstream (through link 202) and upstream (through link 204) while, in the same phase, the relay node 205 is transmitting in both upstream (through link 204) and downstream (through link 206). In phase 2 (denoted by 402), the roles are reversed, that is, the relay node 203 is transmitting and the relay node 205 is receiving. Thereafter, the pattern of initial phases 1 and 2 (denoted by 401 and 402) is repeated (403 and 404 denoting the subsequent repeated phases 1 and 2).

While the use of Tx/Rx patterns was discussed above in relation to a chain topology, it may also be applied to a tree topology (e.g., as illustrated by the wireless backhaul network 260) in a straightforward manner. Moreover, while the example of FIG. 4 illustrates a case where each phase comprises two separate blocks, the embodiments are not limited to this number of signal blocks per phase. FIG. 4 shows an example where fixed Tx/Rx patterns are applied for different relay nodes, and the pattern for 202 and 206 is (exactly) the same. In some scenarios some of the time domain resources (such as slots) may be flexible where the link direction (upstream/downstream, or Tx/Rx) may be determined by the wireless backhaul network (e.g., donor node or the upper hierarchy relay node). These resources may not be desirable for the link monitoring purposes in wireless backhaul networks since the involved nodes (e.g., relay nodes) may not be able to perform the required action (e.g., due to half-duplex constraint).

Figure 5:
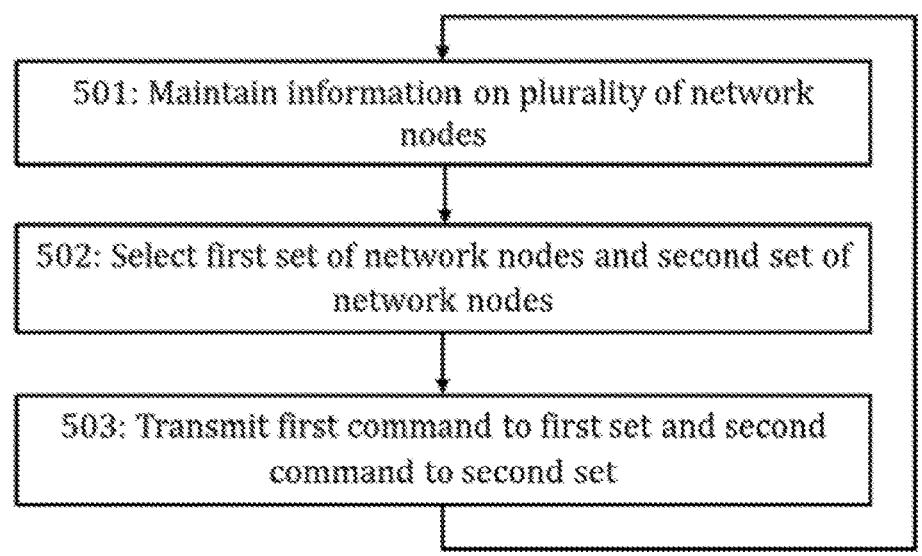
FIGS. 5, 6, 7A, 7B, 8A and 8B, 9, 10, 11A and 11B illustrate processes according to embodiments.

FIG. 5 illustrates a process according to an embodiment for managing the transmission of reference signals from the relay nodes (and donor nodes) and reception of said reference signal by other relay/donor nodes. The illustrated process may be performed by the control node 270 of FIG. 2 or the control node 370 of FIG. 3.

Referring to FIG. 5, the control node initially maintains, in block 501, (e.g., in a database) information on a plurality of network nodes which are configured to perform wireless backhauling in at least one wireless backhaul network and are in communication with the control node. Said information may comprise, for example, information on wired backhauling networks and their properties (e.g., information on donor/relay nodes, current topologies, possible alternative topologies, hierarchy levels and/or past measurement results of reference signals transmitted from one donor/relay node to another) and/or information on Tx/Rx patterns of the plurality of network nodes. The plurality of network nodes may be comprised in at least one wireless backhaul network, wherein each wireless backhaul network comprises at least a donor access node providing wired backhauling and one or more relay nodes providing wireless backhauling via the donor access node either directly or via at least one of the one or more relay nodes (similar to as discussed in relation to FIG. 2). In other words, each of the plurality of network nodes may be a relay node or a donor (access) node. The control node selects, in block 502, a first set of network nodes and a second set of network nodes from the plurality of network nodes according to pre-defined criteria. The first set and the second set are according to the pre-defined criteria disjoint sets (i.e., sets having no common elements). In other words, each network node may be selected only for one of the first set and the second set. In some embodiments, the pre-defined criteria may further define constraints on the selecting based on the backhauling transmission/reception scheduling in the network nodes and/or on hierarchy levels of the wireless backhaul networks (or specifically on master and slave statuses of network nodes assigned based on the hierarchy levels to be discussed in detail in connection with the following embodiments). Each of the first set and the second set may comprise all or some of the relay/donor nodes in a certain wireless backhaul network.

The control node transmits, in block 503, to the first set of network nodes a first command to transmit a reference signal at one or more first pre-defined time instances and to the second set of network nodes a second command to monitor received signals at said one or more first pre-defined time instances to measure the reference signal and to transmit measurement results of the reference signal to the control node. Said one or more first pre-defined time instances may define one or more periodic time instances and/or one or more one-time (or aperiodic) time instances. Moreover, any of the aforementioned time instances may be defined using by defining a time instance ranges (i.e., a range of time during which transmission/monitoring is to occur). The range can be seen also as a multi-shot on top of a given triggering scheme (periodic or aperiodic). Said one or more first pre-defined time instances may be, e.g., one slot or a portion of a slot (such as a mini-slot). In some embodiments, the first command and/or second command may further comprise a command (or a subcommand) to interrupt backhauling during said one or more first time instances (i.e., during measurements) to avoid interference due to the backhauling. These functionalities are discussed in detail in connection with the following embodiments (specifically in relation to FIGS. 7A, 7B, 8A and 8B).

In embodiments where the relay and donor nodes are configured to operate according one or more different Tx/Rx patterns (e.g., as illustrated in FIG. 4), the pre-defined criteria may define that network nodes selected for the first set and the second set, in block 502, should follow two common (i.e., shared) Tx/Rx patterns having opposite phases (i.e., transmission in the first Tx/Rx pattern coincides with the reception in the second Tx/Rx pattern). Said one or more first pre-defined time instances may be defined to be within a transmission phase in the said first common Tx/Rx pattern followed by the first set and within a reception phase in the second common Tx/Rx pattern followed by the second set to enable measurements without interrupting the backhauling. However, such a selection for the first and second sets would allow for simultaneous measurements of relatively few connections as, due to the synchronous behavior of the network nodes, connections between any two network nodes following opposite Tx/Rx patterns could never be measured. Improved solutions for providing simultaneous measurement opportunities for more connections are discussed in connection with the following embodiments.

In some embodiments, the pre-defined criteria may define that network nodes selected for the first set or the second set, in block 502, should follow a common (i.e., shared) Tx/Rx pattern for wireless backhauling while the other set (second or first set) may not have such restrictions (though its operation may instead be restricted in terms of backhauling). In other embodiments, the pre-defined criteria may not involve Tx/Rx patterns in any way.

In some other embodiments, the relay and donor nodes may be configured to operate according to at least a first and second Tx/Rx patterns defined so that transmission phases of the first and second Tx/Rx patterns are at least partially overlapping and reception phases of the first and second Tx/Rx patterns are at least partially overlapping. In some embodiments, the first and second Tx/Rx patterns may be equal (i.e., fully overlapping).

Each of said one or more first pre-defined time instances may be defined to be within a transmission phase of a (first or second) common Tx/Rx pattern followed by the first set (if the first set selected according to the pre-defined criteria follows a common Tx/Rx pattern) or within a reception phase of a (first or second) common Tx/Rx pattern followed by the second set (if the second set selected according to the pre-defined criteria follows a common Tx/Rx pattern). In other words, the relay/donor nodes in the first set may be commanded (using the first command) to transmit the reference signal when they are in a backhauling transmission phase or the relay/donor nodes in the second set may be commanded (using the second command) to monitor received signals when they are in a backhauling receiving phase.

As described in the previous paragraph, the first set of network nodes may be configured to transmit and the second set of network nodes may be configured to receive at one or more first pre-defined time instances. However, this way only one-way measurements may be acquired as some network nodes (i.e., the first set) are always transmitting but never receiving reference signals while others (i.e., the second set) are only receiving. To overcome this issue, the process of FIG. 5 may simply be repeated by switching the first and second sets (i.e., the previous first set is commanded to monitor and the previous second set is commanded to transmit). Alternatively, the control node may further include, in the first command transmitted to the first set, a command to monitor received signals at one or more second pre-defined time instances to measure the reference signal and to transmit measurement results of the reference signal to the control node. Similarly, the control node may also include, in the second command transmitted to the second set, a command to transmit the reference signal at said one or more second pre-defined time instances. Thus, the network nodes may be configured to perform two-way measurements.

Figure 6:
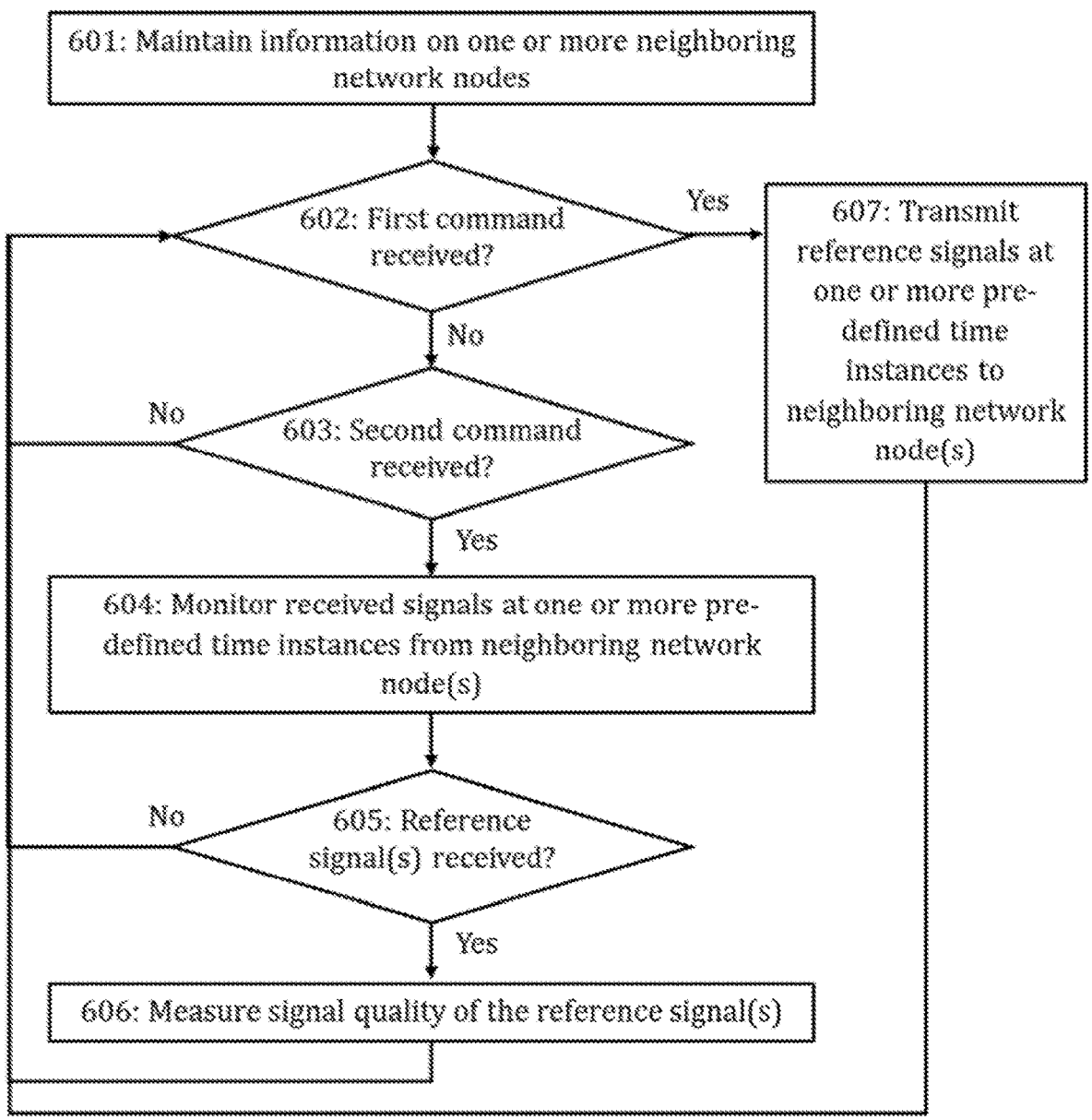

FIG. 6 illustrates a process according to an embodiment carried out by a network node for performing transmission of reference signals from the network nodes and/or reception of a reference signal. The network node may be a relay node or a donor node. Specifically, the illustrated process may be performed by any of the relay or donor nodes in either FIG. 2 or FIG. 3. In some embodiments, the network node may be configured to follow a Tx/Rx pattern which may be similar to the one illustrated in FIG. 4 for any of network nodes 201, 203, 205, 207. In FIG. 6, it is assumed that any received first command comprises only a command to transmit a reference signal at one or more first pre-defined time instances and any received second command comprises only a command to monitor to receive the reference signal(s) at one or more first pre-defined time instances, that is, the first and second command do not comprise both monitoring and transmission commands as discussed in the previous paragraph.

Referring to FIG. 6, the network node maintains, in block 601, (e.g., in a database) information on one or more neighboring network nodes with which the network node is able to form a backhauling link. Said one or more neighboring network nodes may comprise network nodes with which the network node has formed a backhauling link and/or network nodes with which no backhauling link is currently formed but that are candidates for forming a link. Further, said one or more neighboring network nodes may be comprised in the same wireless backhaul network as the network node or in a different backhauling network. If the network node receives, in block 602, a first command to transmit a reference signal at one or more first pre-defined time instances, the network node transmits, in block 607, a reference signal at said one or more first pre-defined time instances to each of one or more of said one or more neighboring network nodes. The first command may comprise information on which network nodes should be targeted by transmitting the reference signal and/or for which beam or beams the signal should be transmitted. If the network node receives, in block 603, a second command to monitor received signals at said one or more first pre-defined time instances to measure the reference signal, the network node monitors, in block 604, received signals at said one or more first pre-defined time instances from said one or more neighboring network nodes (or from one or more of said one or more neighboring network nodes). The second command may comprise information on which network nodes have been configured to transmit the reference signal to the network node and thus from which neighboring network nodes the reference signal is to be received (and possibly using which beam). In response to, while performing the monitoring, receiving, in block 605, one or more reference signals at said one or more first pre-defined time instances from one or more of said one or more neighboring network nodes of the network node, the network node measures, in block 606, signal quality of said one or more reference signals. The measurement may be performed e.g. according to reference signal received power (RSRP) or received signal strength indicator (RSSI) based metric. If the signal to be measured is a control channel, measurement step can be seen as control channel monitoring and reception.

In the embodiments where the first command and/or second command further comprise a command (or a sub-command) to interrupt backhauling during said one or more first time instances (i.e., during measurements) to avoid interference due to the backhauling, the network node may interrupt, in block 604, transmission of all backhauling signals at said one or more first pre-defined time instances. Alternatively, the network node may be configured to automatically interrupt any backhauling transmissions while monitoring for reference signals in block 604. These functionalities are discussed in detail in connection with the following embodiments (specifically in relation to FIGS. 7A, 7B, 8A and 8B).

In FIG. 6, it was assumed that any received first command comprises only a command to transmit a reference signal and any received second command comprises only a command to monitor signals to receive the reference signal(s). In the case of the alternative embodiment described above where the control node includes both transmit and monitoring commands in both the first and second command, the network node performs both the transmitting of the reference signal (block 607) and the monitoring of received signals, the receiving of the reference signal and the measuring of the signal quality (blocks 604 to 606), irrespective of which command (first or second) is received. The transmitting is performed, in this case, according to the definition of the first or second command, that is, either at one or more first time instances in the case of the received first command or at one or more second time instances in the case of the received second command as discussed in connection with the corresponding embodiment of the control node side. Similarly, the monitoring (and the receiving and the measuring) is performed at one or more first time instances in the case of the received second command or at one or more second time instances in the case of the received first command.

Said one or more reference signals as discussed in relation to FIGS. 5 and 6 may comprise one or more signals of any of the following types: a synchronization signal block (SSB) signal, a channel state information reference signal (CSI-RS), a sounding reference signal (SRS), a physical downlink control channel (PDCCH) signal and a physical uplink control channel (PUCCH) signal. The reference signals may be transmitted beam-specifically, that is, the reference signal may be transmitted to a specific target relay/donor node (or to a specific beam of the specific target relay/donor node) using one or more beams of the source relay/donor node providing best signal quality.

Figure 7A:
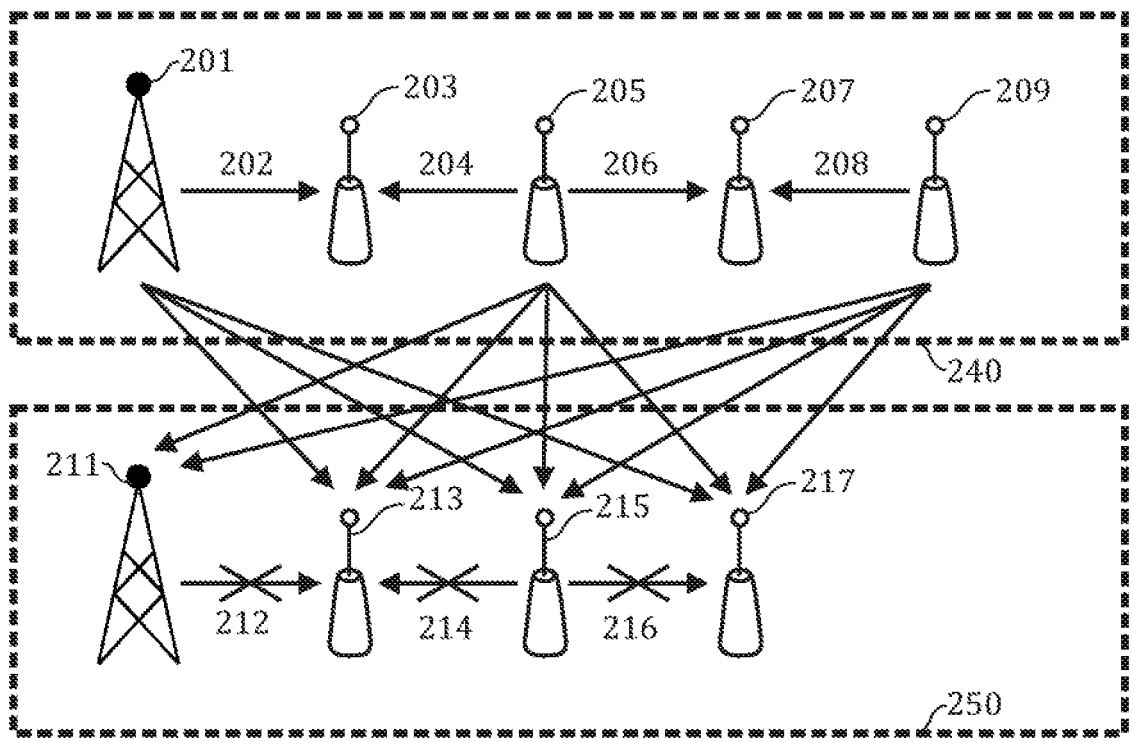
Figure 7B:
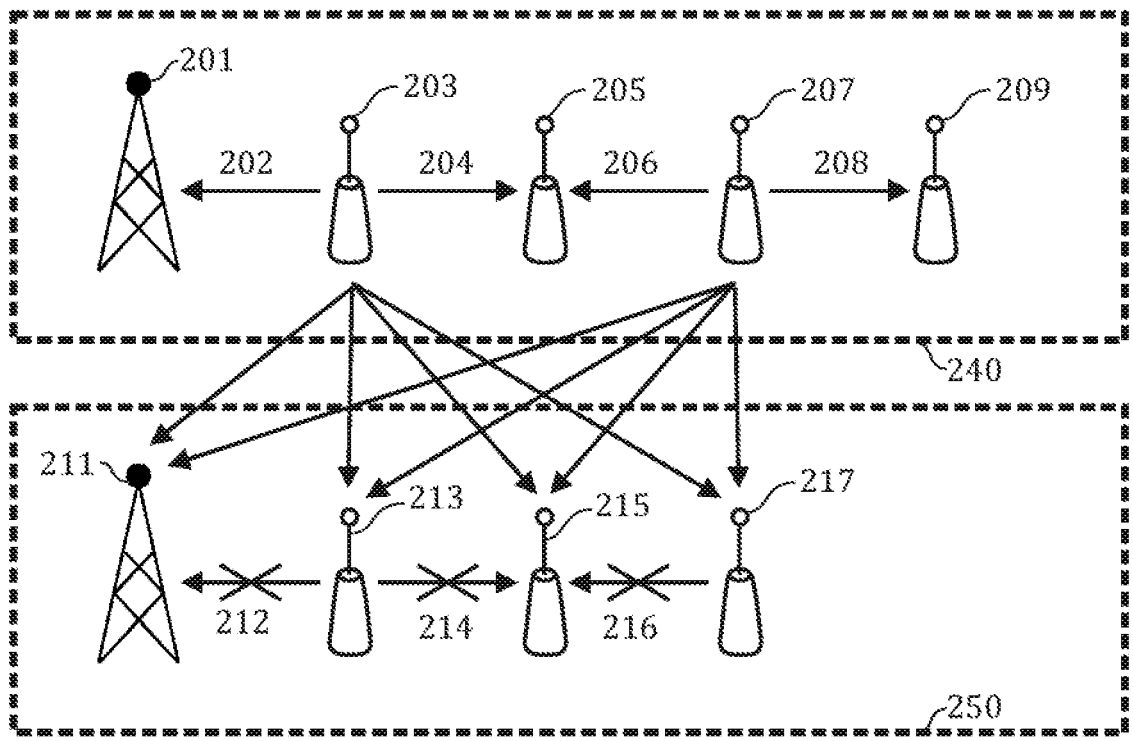
Figure 8A:
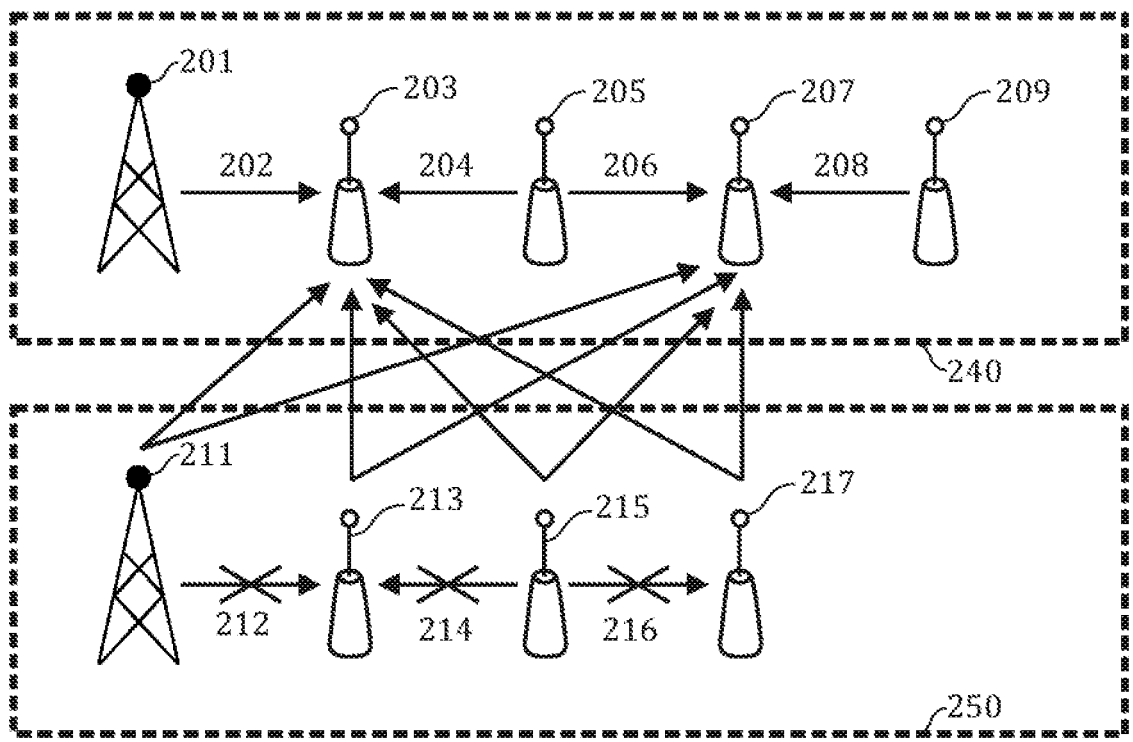
Figure 8B:
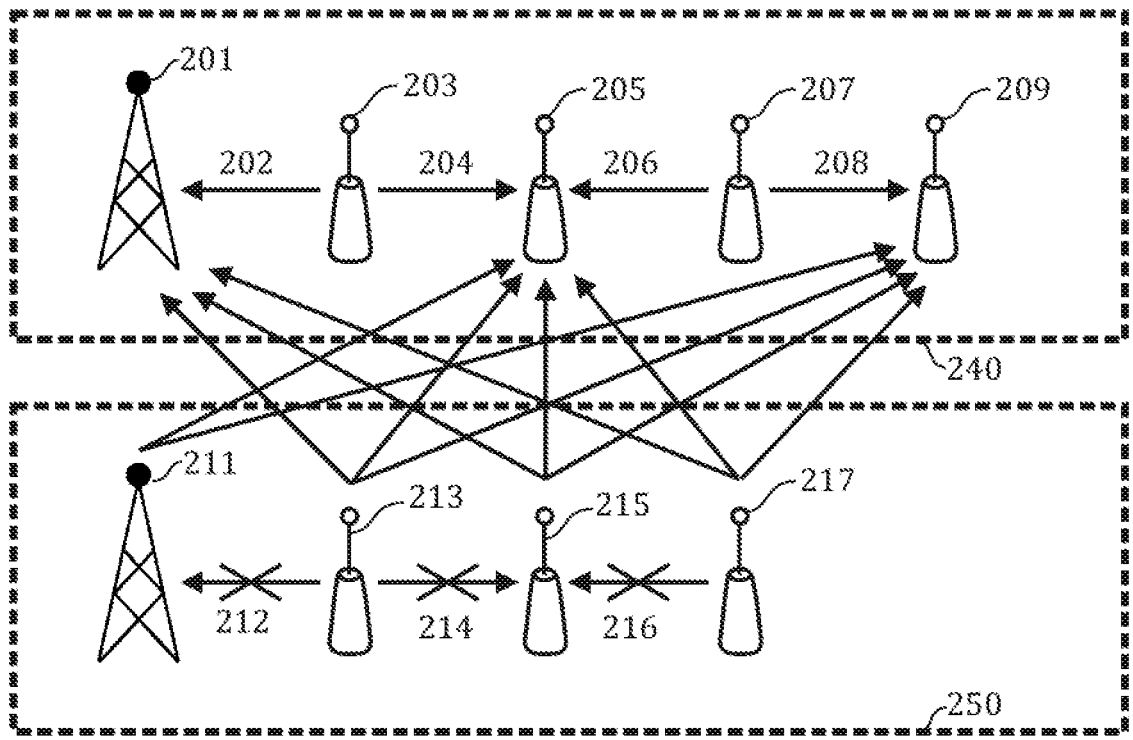

FIGS. 7A and 7B illustrate one example of how measurements of reference signals may be organized between the donor/relay nodes of two wireless backhaul networks (specifically, the wireless backhaul network 240, 250 of FIG. 2 or 3). In this example, it is assumed that the wireless backhaul network 240 has a higher hierarchy level than the wireless backhaul network 250. Moreover, it is assumed that the donor/relay nodes of the wireless backhaul networks 240, 250 follow Tx/Rx patterns similar to as was discussed in relation to FIG. 4. Namely, every other donor/relay node in the chain is configured to transmit and every other to receive at a given phase of the corresponding Tx/Rx patterns. The relay nodes are configured to transmit both in upstream and downstream directions simultaneously (except for the last relay nodes 209, 217 in the chains). FIGS. 7A and 7B correspond, respectively, to a first and a third pre-defined time instance during first and second phases in first and second Tx/Rx patterns followed by the network nodes in the wireless backhaul networks 240, 250. FIGS. 8A and 8B, to be discussed later, illustrate complementary measurements to the measurements of FIGS. 7A and 7B occurring at a second and a fourth pre-defined time instance during first and second phases in first and second Tx/Rx patterns for realizing two-way measurements. The transmission of signals is denoted in FIGS. 7A, 7B, 8A and 8B (as well as in the following Figures) with a solid line, as opposed to a dotted/dashed line as used in FIGS. 2 and 3 for indicating a logical connection.

The transmission of reference signals in FIGS. 7A and 7B is based on the idea of using hierarchy levels associated with the wireless backhaul network. The hierarchy levels may be set arbitrarily or they may be set to allow for continuous backhauling for the most important backhauling connections even during the transmission and/or reception of reference signals with no drop or only a minimal drop in signal quality in said backhauling connections. Before transmitting the first and second commands (and possibly also before selecting the first and second sets), the control node may select network nodes 201, 203, 205, 207, 209 of one or more first wireless backhaul networks 240 of said at least two wireless backhaul networks 240, 250 to be master nodes based on hierarchy levels of said at least two wireless backhaul networks 240, 250. As a basic principle, network nodes in wireless backhaul networks with a higher hierarchy level relative to neighboring wireless backhaul networks are granted master status. Moreover, the control node selects network nodes 211, 213, 215, 217 of one or more second wireless backhaul networks 250 of said at least two wireless backhaul networks 240, 250 to be slave nodes based on hierarchy levels of said at least two wireless backhaul networks 240, 250.

The control node selects the first set and the second set as described in relation to FIG. 5. This selection may be independent of the master/slave status of the network nodes. Alternatively, the pre-defined criteria may be defined so that network node(s) selected for the first set comprise master nodes following the first or second Tx/Rx pattern and network node(s) selected for the second set comprise slave nodes following any transmission/reception time pattern or so that network nodes selected for the second set comprise master nodes following the first or second Tx/Rx pattern network nodes selected for the first set comprise slave nodes following any transmission/reception time pattern. In some embodiments, the first or second set comprising slave nodes may further comprise master node(s) not included in the second or first set, respectively. The selecting of the master/slave nodes may be comprised in block 502 of FIG. 5 or it may be a separate process. For configuring the operation for two phases as demonstrated in FIGS. 7A and 7B (or FIGS. 8A and 8B), the master and slave node selection may be performed only once (that is, it may not be repeated if a master and slave nodes have already been defined). The process of FIG. 5 may be performed twice for configuring the two simultaneous measurements during the two phases. In other words, the selection of the first and second set may be performed separately using different pre-defined criteria as listed above and the transmission of the first and second commands pertaining to the first and third pre-defined time instances may also be performed separately based on the selection of the first and second sets.

The control node includes, in each first command and second command transmitted to the slave nodes (e.g., according to block 503 of FIG. 5), a command for interrupting transmission of all backhauling signals at said one or more first pre-defined time instances. Moreover, the control node may also include, in each first command and second command transmitted to the master nodes, a command for retaining normal backhauling operation during said one or more first pre-defined time instances. Alternatively, such operation may be the default course of action according to configuration of the network nodes and thus no explicit command may be required.

Referring to FIG. 7A, during the illustrated first phase of the Tx/Rx pattern, the relay nodes 205, 209 and the donor node 201 of the wireless backhaul network 240 are transmitting using backhauling links 202, 204, 206, 208. According to their shared Tx/Rx pattern, the relay node 215 and the donor node 211 of the wireless backhaul network 250 are also transmitting during the first phase. However, this backhaul transmission is interrupted at the first pre-defined time instance illustrated in FIG. 7A (as denoted by crossed out arrows 212, 214, 216) to enable monitoring of reference signals. As backhauling is interrupted in the wireless backhaul network 250, all of the relay nodes 213, 215, 217 and the donor node 211 of said wireless backhaul network 250 (i.e., all of the slave nodes) may be configured by the control node to perform monitoring to receive any reference signals transmitted to them by the relay nodes 205, 209 and the donor node 201 (as illustrated by arrows). Thus, the relay nodes 205, 209 and the donor node 201 may be configured by the control node to transmit the reference signal at least to the relay nodes 213, 215, 217 and the donor node 211 (or in some embodiments to specific beams of said nodes 211, 213, 215, 217). In some embodiments, only some of the master nodes 201, 205, 209 in a transmitting phase of their Tx/Rx pattern may be configured to transmit the reference signal and/or only some of the slave nodes 211, 213, 215, 217 may be configured to perform monitoring. In other embodiments, the relay nodes 205, 209 may also be configured to transmit the reference signal to one or more relay/donor nodes (configured to receive backhauling signals during said first phase) within their own wireless backhaul network 240.

Referring to FIG. 7B, during the illustrated second phase of the Tx/Rx patterns, the relay nodes 203, 207 of the wireless backhaul network 240 are transmitting using backhauling links 202, 204, 206, 208. The relay/donor nodes 201, 205, 209 which were transmitting during the first phase are now receiving backhauling signals and thus unable to transmit reference signals. Similar to FIG. 7A, all backhaul transmission in the wireless backhaul network 250 is interrupted also at the third time instance illustrated in FIG. 7B (as denoted by crossed out arrows 212, 214, 216) to enable monitoring of reference signals from the relay nodes 203, 207. Similar to as was described in relation to FIG. 7A, only some of the master nodes 203, 207 in a transmitting phase of their Tx/Rx pattern may be configured to transmit the reference signal and/or only some of the slave nodes 211, 213, 215, 217 may be configured to perform monitoring, in some embodiments. In some embodiments, the transmission of reference signal may be performed beam-specifically. In some embodiments, the relay nodes 203, 207 may also be configured to transmit the reference signal to one or more relay/donor nodes (configured to receive backhauling signals during said first phase) within their own wireless backhaul network 240.

FIGS. 8A and 8B illustrate, in a sense, inverse reference signal measurement scheme compared to FIGS. 7A and 7B. While in FIGS. 7A and 7B the master nodes of the wireless backhaul network 240 were configured to transmit reference signals while the slave nodes of the wireless backhaul network 250 were configured only to receive reference signals, FIGS. 8A and 8B illustrate a case where the master nodes of the wireless backhaul network 240 are configured to receive reference signals transmitted by the slave node of the wireless backhaul network 250. FIGS. 8A and 8B correspond, respectively, to a second and a fourth pre-defined time instance during first and second phases in first and second Tx/Rx patterns followed by the network nodes in the wireless backhaul networks 240, 250. In some embodiments of the scenario illustrated in FIGS. 8A and 8B, the transmission of reference signal may be performed beam-specifically.

Referring to FIG. 8A, during the illustrated first phase of the Tx/Rx pattern, the relay nodes 203, 207 of the wireless backhaul network 240 are configured to receive backhauling signals using backhauling links 202, 204, 206, 208. Similar to FIG. 7A, all backhaul transmission is interrupted at the second pre-defined time instance illustrated in FIG. 8A (as denoted by crossed out arrows 212, 214, 216). In the illustrated example, all the slave nodes 211, 213, 215, 217 of the wireless backhaul network 250 are configured to transmit reference signals. Said reference signals are transmitted only to the relay nodes 203, 207 which are configured to receive the reference signal as well as backhauling signals according to their shared Tx/Rx pattern.

FIG. 8B illustrates the second phase of the Tx/Rx patterns (or specifically a fourth pre-defined time instances therein). In this case, all the slave nodes 211, 213, 215, 217 of the wireless backhaul network 250 are configured to transmit the reference signal at the second pre-defined time instance to the donor node 201 and to the relay nodes 205, 209 which, in turn, are configured receive said reference signal at the second pre-defined time instance.

While the principle of assigning master and slave nodes and prioritizing backhauling transmission in the master nodes but not in the slave nodes over the measurements of reference signal was demonstrated with the illustrated examples of FIGS. 7A, 7B, 8A and 8B where only chain topologies were used, said principle may be employed with any wireless backhaul network of any topology.

In some embodiments, instead of selecting master and slave nodes and configuring slave nodes to interrupt backhauling during the reference signal measurements, interference-free measurements of reference signals between network nodes following any Tx/Rx patterns may be arranged in a simpler manner. One or more pre-defined (first) time instances may define backhauling gaps that are simultaneously applied using the first and/or second command to all network nodes in said at least one wireless backhaul network in the communications system managed by the control node. Specifically, the first and/or second command may comprise a (sub) command for interrupting backhauling or the network nodes may be configured to interrupt backhauling automatically when they are monitoring to receive the reference signal. During the backhauling gap, all backhauling is interrupted and each network node is either transmitting reference signals or monitoring the reception of reference signals of the transmitting network nodes, as discussed in relation to earlier embodiments. The Tx/Rx pattern followed by a particular network node may, in this case, be random (or arbitrary) or based on coordination allowing nearby nodes to measure each other's signals in an efficient way (e.g., transmitting with even network nodes and receiving with odd network nodes or vice versa as illustrated in FIGS. 7A, 7B, 8A and 8B). For example, any of FIGS. 7A, 7B, 8A and 8B would correspond to this simpler scheme if the all the backhauling links also in the wireless backhaul network 240 were interrupted (i.e., all the horizontal arrows 202, 204, 206, 208 were crossed out).

Figure 9:
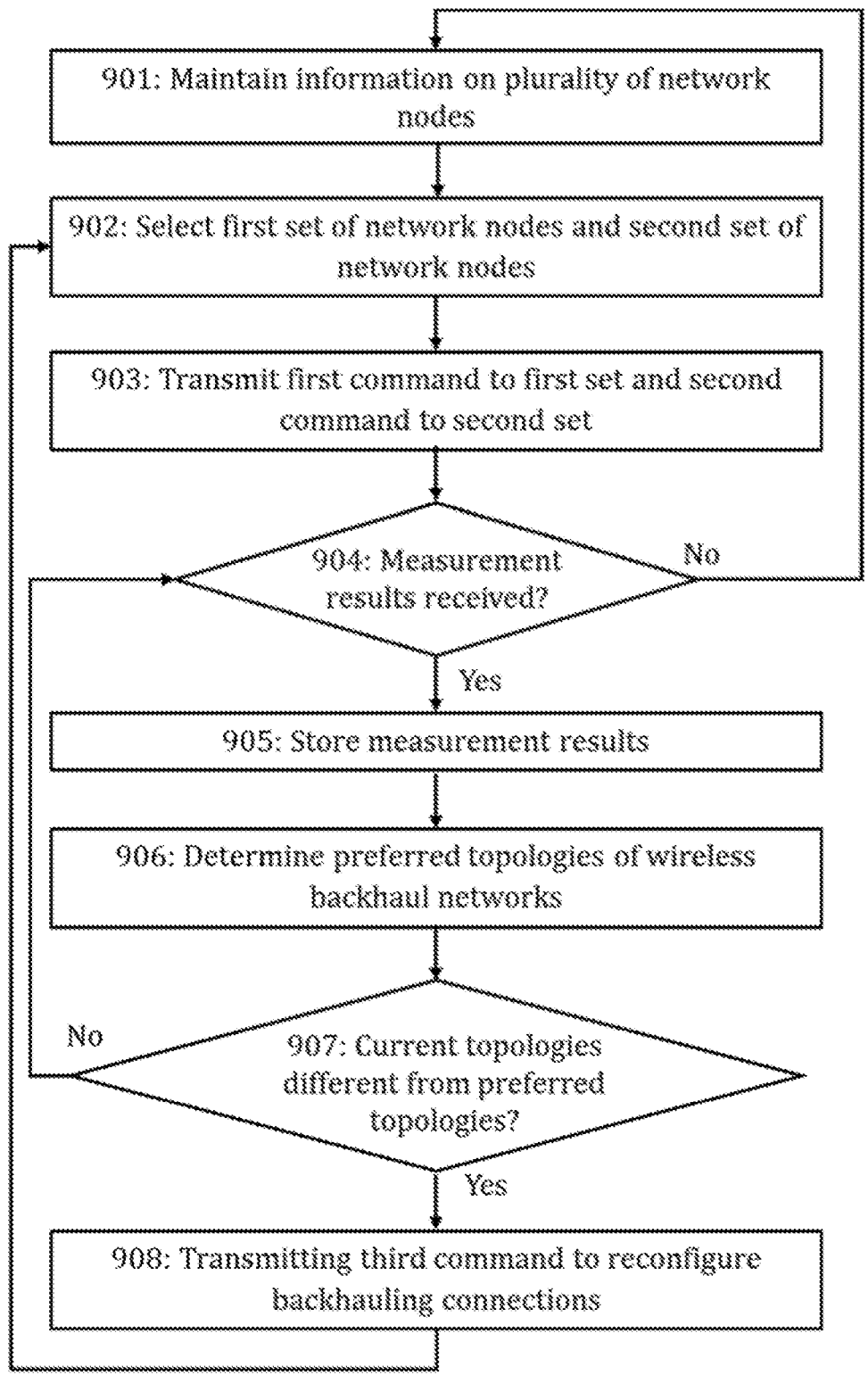

While previous embodiments related solely to providing measurement opportunities for the relay/donor nodes and subsequently performing measurements of reference signals, FIG. 9 illustrates a process according to an embodiment which, in addition, enables utilizing said measurement results for assessing the operation of the wireless backhauling networks and if necessary, improving their operation. The illustrated process may be performed by the control node 270 of FIG. 2 or the control unit 370 (or control node) of FIG. 3. The process is an extension of the process of FIG. 5. Namely, blocks 901 to 903 of FIG. 9 may correspond to blocks 501 to 503 of FIG. 5. The discussion related to said blocks will, thus, not be repeated here for brevity.

Referring to FIG. 9, after the first and second commands have been transmitted to the network nodes in the first and second sets, the control node waits for the measurements results to be transmitted from the network nodes of the second set (or the first set if one or more second pre-defined time instances for reception are defined in the first command). If measurements results from one or more network nodes are received, in block 904, the network node stores, in block 905, the measurement results to the database of the control node. The control node determines, in block 905, based on the measurement results of the reference signal (i.e., measurement results pertaining to one or more transmissions of the reference signal) at the second set of network nodes and other information on the plurality of network nodes (e.g., previous measurement results, current topologies) maintained in the database, preferred topologies (or routing) for said at least one wireless backhaul network. The determining of preferred topologies/routing may comprise determining the preferred type of topology (e.g., chain, tree or mesh topology) and/or determining the structure of the chosen topology (e.g., where branching points are located in a tree topology). In response to one or more current topologies for said at least one wireless backhaul network being, in block 907, different from the corresponding preferred topology for backhauling based on the determining, the control node transmits, in block 908, a third command to reconfigure backhauling connections to implement one or more preferred topologies replacing said one or more current topologies to each network node associated with said one or more current topologies. The information on the current topologies may be maintained in the database of the control node. If said one or more first/second time instances defined in the first and second commands comprise two or more time instances or a periodic definition for the first and/or second time instance, the control node may receive, in block 904, measurements results also periodically from the network nodes. Thus, the need for a reconfiguration of the topologies may also be checked periodically.

Figure 10:
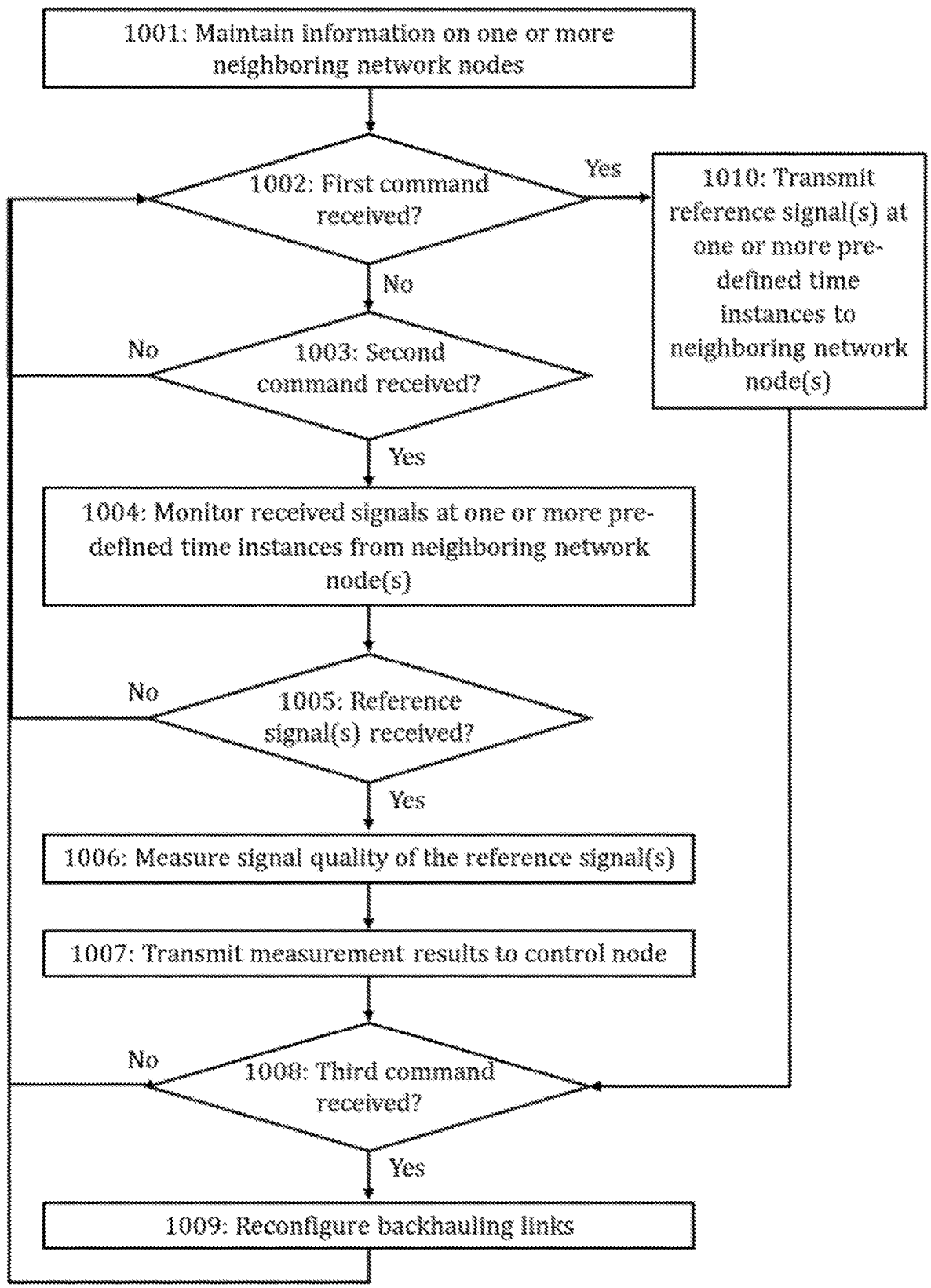

FIG. 10 illustrates a process according to an embodiment which further enables utilizing said measurement results for assessing the operation of the wireless backhauling networks and if necessary, improving their operation. The network node may be a relay node or a donor node. Specifically, the illustrated process may be performed by any of the relay or donor nodes in either FIG. 2 or FIG. 3. The process is an extension of the process of FIG. 6. Namely, blocks 1001 to 1006 and block 1010 of FIG. 10 may correspond to blocks 601 to 606 and block 607 of FIG. 6. The discussion related to said blocks will, thus, not be repeated here for brevity.

Referring to FIG. 10, it is assumed that the first and second command possibly received, in blocks 1002 and 1003, by the network node comprise a command to transmit measurement results of a reference signal to the control node. Accordingly, after the measurement in block 1006, the control node transmits, in block 1007, the measurement results to the control node. The measurement results may be transmitted, for example, as radio resource control (RRC) signals. In response to receiving, in block 1008, a third command to reconfigure backhauling connection, the network node reconfigures, in block 1009, the backhauling connections so as to a more optimal topology for the wireless backhaul network. The reconfiguring in block 1009 may comprise one or more of the following actions: establishing one or more new wireless backhauling connections to one or more neighboring network nodes (relay and/or donor nodes) in the same wireless backhaul network, establishing one or more new wireless backhauling connections to one or more neighboring network nodes (relay and/or donor nodes) in a different wireless backhaul network, breaking one or more existing backhauling connections to one or more neighboring network nodes (relay and/or donor node) in the same wireless backhaul network and reconfiguring the Tx/Rx pattern followed by the network node (e.g., when the hop count calculated starting from the donor node for the network node changes due to a topology change).

Figure 11A:
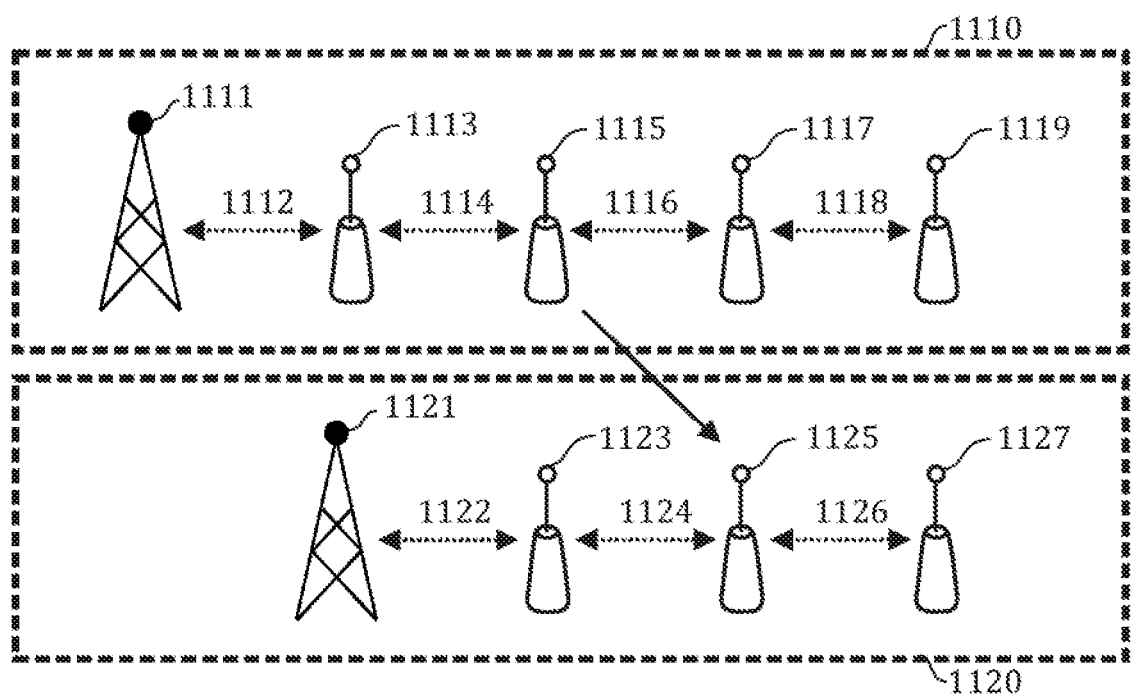
Figure 11B:
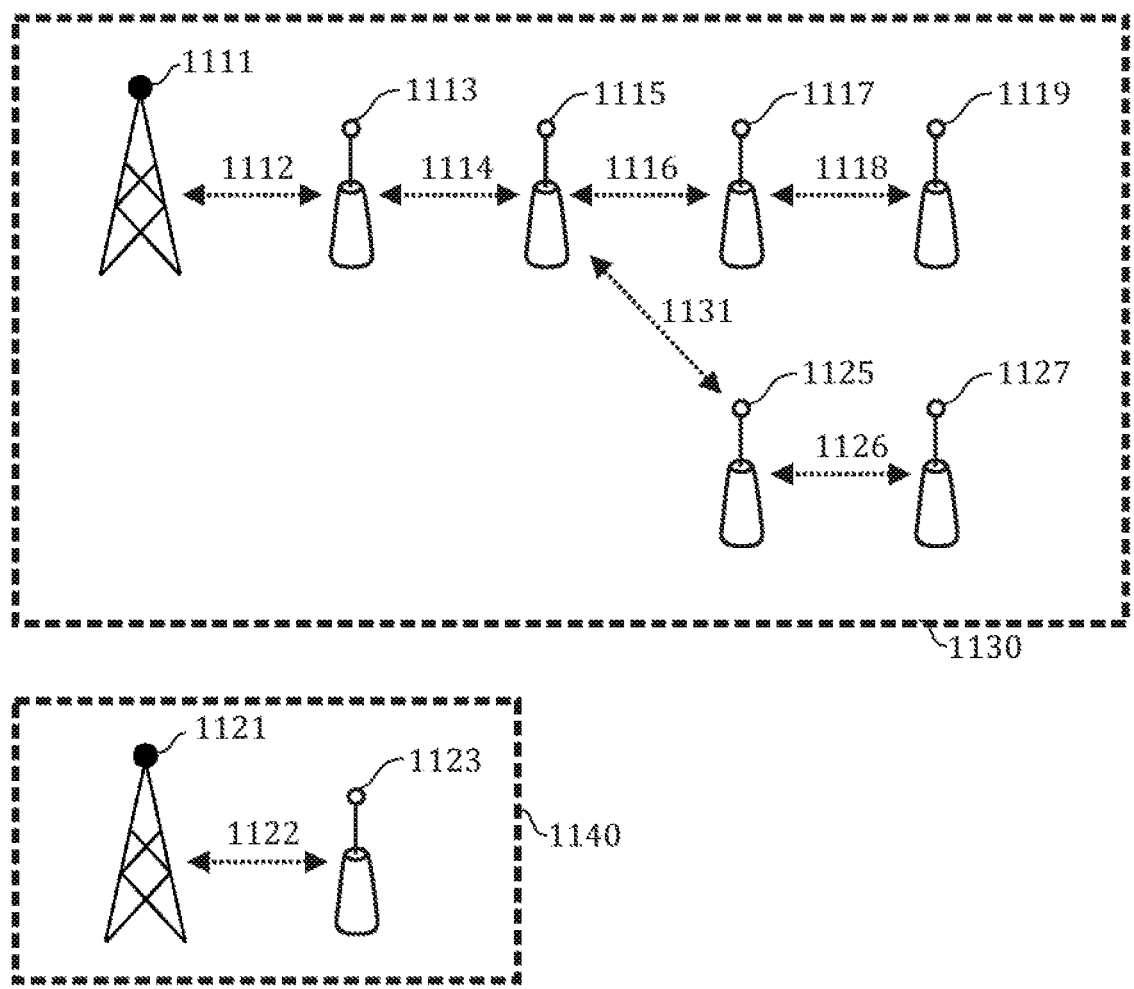

FIGS. 11A and 11B illustrate an example of a change in topology which may occur as a result of the processes of FIGS. 9 and 10. The wireless backhaul network 1130 may correspond the wireless backhaul network 260 of FIG. 2 or 3.

FIG. 11A illustrates the initial configuration with two wireless backhaul networks 1110, 1120, each corresponding to a chain topology. In FIG. 11A, a reference signal is transmitted from the relay node 1115 of the wireless backhaul network 1110 to the relay node 1125 of the wireless backhaul network 1120 at a pre-defined time instance (according to a first/second command received from the control node). Correspondingly, the relay node 1125 is configured by the control node to monitor received signals from the relay node 1115 at said pre-defined time instance. Other measurements of the reference signals transmitted by the relay node 1115 or some other relay node may occur simultaneously though these actions are omitted from FIG. 11A and from this discussion for simplicity. The relay node 1125 measures the signal quality of the received reference signal and transmits the measurement results to the control node.

In the control node, it is determined based on said measurement results and previous measurement results (concerning particularly network nodes 1121, 1123, 1125) that better backhauling connection may be provided for the relay nodes 1125, 1127 via the relay nodes 1115, 1113 and the donor node 1111 compared to the existing backhauling connection via the relay nodes 1123 and the donor node 1121. Thus, the control node transmits a third command at least to the relay node 1125. The third command may comprise at least commands to break the backhauling connection 1124 with the relay node 1123 and to establish a new backhauling connection 1131 with the relay node 1115. Furthermore, if the network node in the wireless backhaul networks 1110, 1120 follow two complementary Tx/Rx patterns as discussed in relation to FIG. 4 (i.e., network nodes at even hop count transmitting and at odd hop count receiving in a given phase or vice versa), the third command may further comprise a command to switch its Tx/Rx pattern as the hop count of the relay node 1125 changes from even to odd. In this case, a third command needs to be transmitted by the control node also to the relay node 1127 as it also need to switch its Tx/Rx pattern due to a change in hop count.

FIG. 11B illustrates the changed, preferred configuration for the two wireless backhaul networks 1130, 1140 resulting from the relay node(s) carrying out the third command(s) transmitted by the control node. In FIG. 11B, the new backhauling connection 1131 for the relay node 1125 has been established while the old backhauling connection from the relay node 1125 to the relay node 1123 has been broken. Thus, the wireless backhaul network 1140 comprises, in the new configuration, only a single relay node 1123 and a donor node 1121. On the other hand, the wireless backhaul network 1110 of FIG. 11A having chain topology has been transformed to the wireless backhaul network 1130 having tree topology.

The embodiments discussed above may provide at least some of the following advantages or technical effects. The solutions according to embodiments may enable efficient monitoring of neighbor relay and/or donor nodes with minimized backhauling gaps and/or allow monitoring of any hierarchy level of the relay network topology. It is up to the configuration to determine whether to have one-shot or repeated measurements (and which period is used for the measurements). Thus, results overhead may be minimized and adapted to the scenario.

The blocks, related functions, and information exchanges described above by means of FIGS. 5, 6, 7A, 7B, 8A, 8B, 9, 10, 11A and 11B are in no absolute chronological order, and some of them may be performed simultaneously or in an order differing from the given one. In some embodiments, some of the steps may be neglected, for example, if the relevant information is already available (e.g., stored to a memory).

Figure 12:
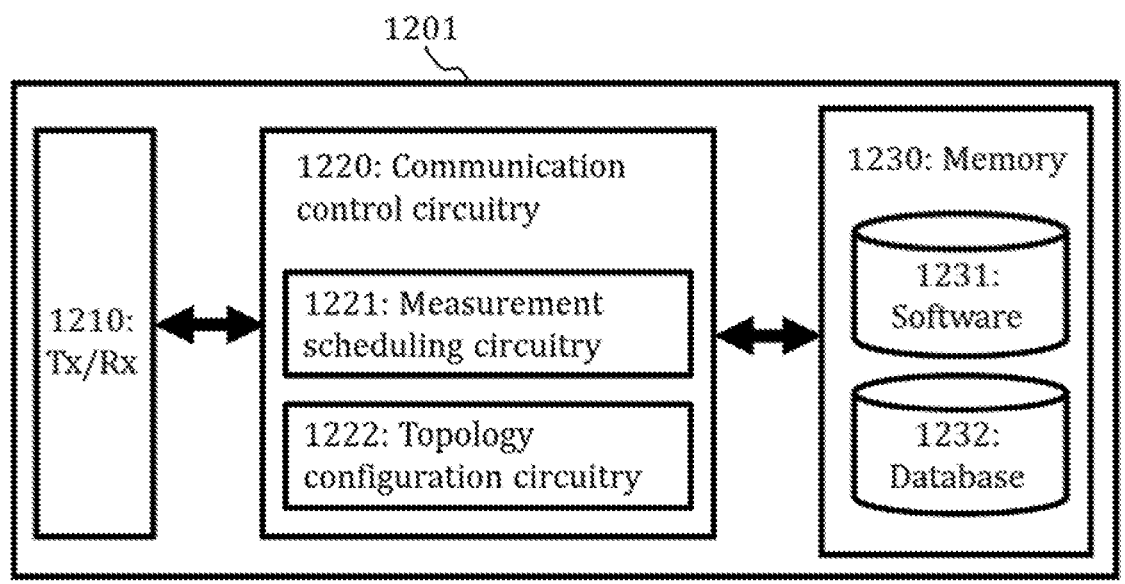
FIGS. 12 and 13 illustrate apparatuses according to embodiments.

FIG. 12 illustrates an apparatus 1201 configured to carry out the functions described above in connection with a control node or control unit such as control node 270 shown in FIG. 2 or the control unit 370 shown in FIG. 3. The apparatus may be an electronic device comprising electronic circuitries. The apparatus may be a separate network entity or a plurality of separate entities. The apparatus may comprise a communication control circuitry 1220, such as at least one processor, and at least one memory 1230 including a computer program code (software) 1231 wherein the at least one memory and the computer program code (software) are configured, with the at least one processor, to cause the apparatus to carry out any one of the embodiments of the relay node described above.

The memory 1230 may comprise a database 1232 which may comprise information on a plurality of network nodes, as described in previous embodiments. The database 1232 may further comprise a set of measurement results received from network nodes (relay or donor nodes), pre-defined criteria for selecting first and second sets as described in the previous embodiments, one or more first pre-defined time instances and/or one or more second pre-defined time instances. The memory 1230 may also comprise other databases which may not be related to the described measurement and topology configuration functionalities according to embodiments.

Referring to FIG. 12, the communication control circuitry 1220 may comprise measurement scheduling circuitry 1221 and/or topology configuration circuitry 1222. The measurement scheduling circuitry 1221 may be configured, for example, to carry out at least some of blocks 501 to 503 of FIG. 5 and blocks 901 to 905 of FIG. 9. The measurement scheduling circuitry 1221 may also be configured to select master and slave nodes as discussed in relation to FIG. 7A. The topology configuration circuitry 1222 may be configured, for example, to carry out at least some of block 1007 to 1009 of FIG. 10.

Figure 13:
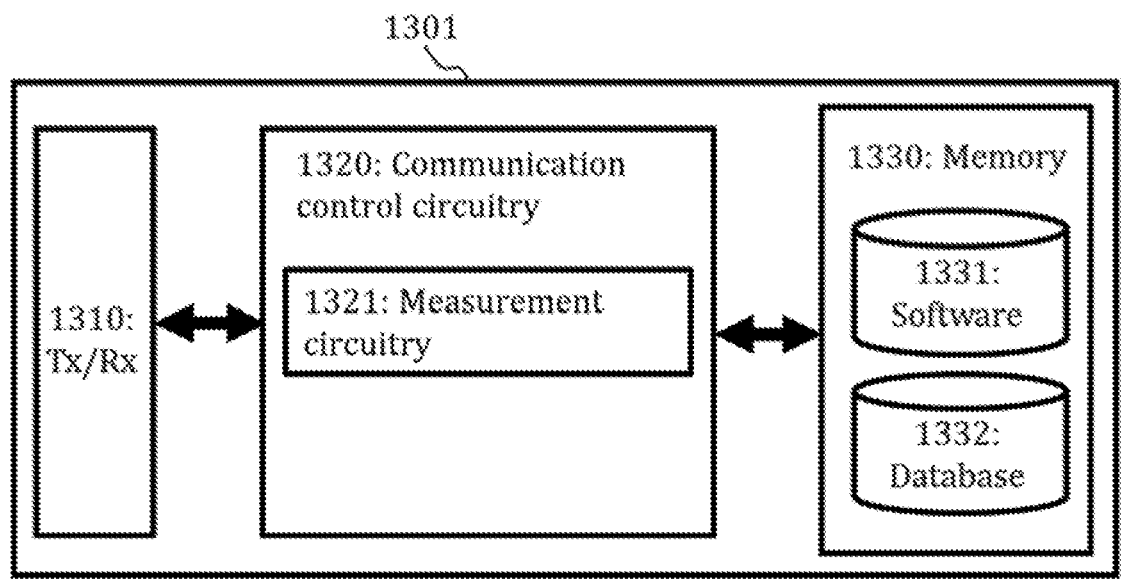

FIG. 13 illustrates an apparatus 1301 configured to carry out the functions described above in connection with a network node, such as any relay node or donor node in FIG. 2 or FIG. 3. The apparatus may be an electronic device comprising electronic circuitries. The apparatus may be a separate network entity or a plurality of separate entities. The apparatus may comprise a communication control circuitry 1320 such as at least one processor, and at least one memory 1330 including a computer program code (software) 1331 wherein the at least one memory and the computer program code (software) are configured, with the at least one processor, to cause the apparatus to carry out any one of the embodiments of the network node (a relay node or a donor node) described above.

The memory 1330 may comprise a database 1332 which may comprise at least information on neighboring network nodes, as described in previous embodiments. The memory 1330 may also comprise other databases which may not be related to the functionalities of the network node according to any of presented embodiments such as any databases used by relay or donor nodes in conventional operation.

Referring to FIG. 13, the communication control circuitry 1320 may comprise measurement circuitry 1321 configured to provide the network node functionalities according to any of presented embodiments. The measurement circuitry 1321 may be configured to carry out at least some of blocks in FIGS. 6 and 10. Moreover, the measurement circuitry 1321 may be configured to carry out at least some of actions illustrated in FIGS. 7A, 7B, 8A, 8B, 11A and 11B. In some embodiments, the communication control circuitry 1320 may further comprise measurement scheduling circuitry and/or topology configuration circuitry which may be similar to as described in relation to FIG. 12. This type of embodiment corresponds to the implementation as shown in FIG. 3, specifically to an apparatus comprising both donor node 201 and the control unit 370.

The apparatuses 1201, 1301 described in relation to FIGS. 12 and 13 may further comprise communication interfaces (Tx/Rx) 1210, 1310 comprising hardware and/or software for realizing communication connectivity according to one or more communication protocols. The communication interface may provide the apparatus with communication capabilities to communicate in the cellular communication system and enable communication, for example, with network nodes and terminal devices as well as in the case of the apparatus 1301 of FIG. 13 with a control node. The communication interface 1210, 1310 may comprise standard well-known components such as an amplifier, filter, frequency-converter, (de)modulator, and encoder/decoder circuitries and one or more antennas. The communication interface 1210, 1310 may comprise radio interface components providing the apparatus with radio communication capability in the cell.

The memories of the apparatuses described in relation to FIGS. 12 and 13 may be implemented using any suitable data storage technology, such as semiconductor based memory devices, flash memory, magnetic memory devices and systems, optical memory devices and systems, fixed memory and removable memory.

As used in this application, the term "circuitry may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 5, 6, 7A, 7B, 8A, 8B, 9, 10, 11A and 11B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 5, 6, 7A, 7B, 8A, 8B, 9, 10, 11A and 11B or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 5, 6, 7A, 7B, 8A, 8B, 9, 10, 11A and 11B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A control node comprising:

at least one processor; and at least one memory comprising computer program code, the at least one memory and computer program code configured, with the at least one processor, to cause the control node at least to maintain information, in a database, on a plurality of network nodes which are configured to perform wireless backhauling in at least two wireless backhaul networks and are in communication with the control node, wherein each of the plurality of network nodes is one of a donor access node and a relay node and the information on the plurality of network nodes comprises information on transmission/reception time patterns of the plurality of network nodes used for wireless backhauling in said at least two wireless backhaul networks;

select, based on the information on the plurality of network nodes and according to pre-defined criteria, a first set of network nodes and a second set of network nodes from the plurality of network nodes, wherein the first set and the second set are defined in the pre-defined criteria to be disjoint sets selected following restrictions based at least on the transmission/reception time patterns of the plurality of network nodes used for wireless backhauling so that one of the first set and the second set comprises at least some of network nodes in a first wireless backhaul network of said at least two wireless backhaul networks and the other of the first set and the second set comprises at least some of network nodes in a second wireless backhaul network of said at least two wireless backhaul networks; and transmit to the first set of network nodes a first command to transmit a reference signal at one or more first pre-defined time instances and to the second set of network nodes a second command to monitor received signals at said one or more first pre-defined time instances to measure signal quality of the reference signal, wherein the signal quality of the reference signal is configured to be measured over at least one link not currently used for wireless backhauling in said at least two wireless backhaul networks.

2. The control node according to claim 1, wherein the at least one memory and computer program code are configured, with the at least one processor, to cause the control node at least to:

include, in the second command, a command to transmit measurement results of the reference signal to the control node; and in response to receiving the measurement results of the reference signal at the second set of network nodes from the second set of network nodes, store the measurements results to the database.

3. The control node according to claim 1, wherein each network node in the plurality of network nodes is configured to perform wireless backhauling according to one of a first transmission/reception time pattern and a second transmission/reception time pattern, wherein the pre-defined criteria define that network nodes selected for the first set follow the first or second transmission/reception time pattern for wireless backhauling or network nodes selected for the second set follow the first or second transmission/reception time pattern for wireless backhauling.

4. The control node according to claim 1, wherein each of said at least two wireless backhaul networks corresponds to a hierarchy level determining to which extent communications within said wireless backhaul network is to be prioritized over other wireless backhaul networks, the information on the plurality of network nodes comprising hierarchy levels of the plurality of network nodes, wherein the at least one memory and computer program code are configured, with the at least one processor, to cause the control node at least to:

select network nodes of one or more first wireless backhaul networks of said at least two wireless backhaul networks to be master nodes based on hierarchy levels of said at least two wireless backhaul networks;

select network nodes of one or more second wireless backhaul networks of said at least two wireless backhaul networks to be slave nodes based on hierarchy levels of said at least two wireless backhaul networks; and include, in each first command and second command transmitted to the slave nodes, a command for interrupting transmission of all backhauling signals at said one or more first pre-defined time instances.

5. The control node according to claim 4, wherein each network node in the plurality of network nodes is configured to perform wireless backhauling according to one of a first transmission/reception time pattern and a second transmission/reception time pattern, the information on the plurality of network nodes comprising information on transmission/reception time patterns, the pre-defined criteria being defined to demand one of the following:

network nodes selected for the first set comprise master nodes following the first transmission/reception time pattern and network nodes selected for the second set comprise slave nodes following either transmission/reception time pattern and/or master nodes following the second transmission/reception time pattern, network nodes selected for the second set comprise master nodes following the first transmission/reception time pattern for wireless backhauling and network nodes selected for the first set comprise slave nodes following either transmission/reception time pattern and/or master nodes following the second transmission/reception time pattern, network nodes selected for the first set comprise master nodes following the second transmission/reception time pattern and network nodes selected for the second set comprise slave nodes following either transmission/reception time pattern and/or master nodes following the first transmission/reception time pattern and network nodes selected for the second set comprise master nodes following the second transmission/reception time pattern and network nodes selected for the first set comprise slave nodes following either transmission/reception time pattern and/or master nodes following the first transmission/reception time pattern.

6. The control node according to claim 3, wherein if the pre-defined criteria define that the first set of network nodes follow only one of the first and the second transmission/reception time pattern, said one or more first pre-defined time instances are defined to be within a transmission phase of said one of the first and the second transmission/reception time pattern followed by the first set and if the pre-defined criteria define that the second set of network nodes follow only one of the first and the second transmission/reception time pattern, said one or more first pre-defined time instances are defined to be within a reception phase of said one of the first and the second transmission/reception time pattern followed by the second set.

7. The control node according to claim 1, wherein the at least one memory and computer program code are configured, with the at least one processor, to cause the control node at least to:

include, in the first command, a command to monitor received signals at one or more second pre-defined time instances to measure the reference signal and to transmit measurement results of the reference signal to the control node; and include, in the second command, a command to transmit the reference signal at said one or more second pre-defined time instances.

8. The control node according to claim 1, wherein the at least one memory and computer program code are configured, with the at least one processor, to cause the control node at least to:
- determine, based on the measurement results of the reference signal at the second set of network nodes and on the information on the plurality of network nodes, preferred topologies for said at least one wireless backhaul network; and
- in response to one or more current topologies for said at least one wireless backhaul network being different from the preferred topologies for backhauling based on the determining, transmit a third command to reconfigure backhauling connections to implement one or more preferred topologies replacing said one or more current topologies to each network node associated with said one or more current topologies.

9. The control node according to claim 1, wherein the control node is one of a donor access node and a relay node in said at least two wireless backhaul networks or a core network node in a core network of said at least two wireless backhaul networks.

10. The control node according to claim 1, wherein the at least one memory and computer program code are configured, with the at least one processor, to cause the control node at least to:
- include, in one or more of the first command and the second command, a command for interrupting transmission of all backhauling signals at said one or more first pre-defined time instances.

11. A method comprising:
- maintaining information, in a database, on a plurality of network nodes which are configured to perform wireless backhauling in at least two wireless backhaul networks and are comprised in at least one wireless backhaul network, wherein each of the plurality of network nodes is one of a donor access node and a relay node and the information on the plurality of network nodes comprises information on transmission/reception time patterns of the plurality of network nodes used for wireless backhauling in said at least two wireless backhaul networks;
- selecting, based on the information on the plurality of network nodes and according to pre-defined criteria, a first set of network nodes and a second set of network nodes from the plurality of network nodes, wherein the first set and the second set are defined in the pre-defined criteria to be disjoint sets selected following restrictions based at least on the transmission/reception time patterns of the plurality of network nodes used for wireless backhauling so that one of the first set and the second set comprises at least some of network nodes in a first wireless backhaul network of said at least two wireless backhaul networks and the other of the first set and the second set comprises at least some of network nodes in a second wireless backhaul network of said at least two wireless backhaul networks; and
- transmitting to the first set of network nodes a first command to transmit a reference signal at one or more first pre-defined time instances and to the second set of network nodes a second command to monitor received signals at said one or more first pre-defined time instances to measure signal quality of the reference signal, wherein the signal quality of the reference signal is configured to be measured over at least one link not currently used for wireless backhauling in said at least two wireless backhaul networks.

12. A computer program embodied on a non-transitory computer-readable medium, said computer program comprising instructions which, when run on a processor, control the processor to perform:
- selecting, based on information on a plurality of network nodes configured to perform wireless backhauling in at least two wireless backhaul networks and according to pre-defined criteria, a first set of network nodes and a second set of network nodes from the plurality of network nodes, wherein each of the plurality of network nodes is one of a donor access node and a relay node and the first set and the second set are defined in the pre-defined criteria to be disjoint sets selected following restrictions based at least on transmission/reception time patterns of the plurality of network nodes used for wireless backhauling so that one of the first set and the second set comprises at least some of network nodes in a first wireless backhaul network of said at least two wireless backhaul networks and the other of the first set and the second set comprises at least some of network nodes in a second wireless backhaul network of said at least two wireless backhaul networks; and
- causing transmitting to the first set of network nodes a first command to transmit a reference signal at one or more first pre-defined time instances and to the second set of network nodes a second command to monitor received signals at said one or more first pre-defined time instances to measure signal quality of the reference signal, wherein the signal quality of the reference signal is configured to be measured over at least one link not currently used for wireless backhauling in said at least two wireless backhaul networks.

13. A network node of a wireless backhaul network, wherein the network node is a donor access node or a relay node of the wireless backhaul network and comprises means for performing the following:
- maintaining information, in a database, on one or more neighboring network nodes with which the network node is able to form a wireless backhauling link but with which no wireless backhauling link is currently formed;
- transmitting and receiving backhauling signals in the wireless backhaul network following a transmission/reception time pattern;
- in response to receiving, from a control node, a first command to transmit a reference signal at one or more first pre-defined time instances, transmitting the reference signal at said one or more first pre-defined time instances to one or more of said one or more neighboring network nodes;
- in response to receiving, from the control node, a second command to monitor received signals at said one or more first pre-defined time instances to measure the reference signal, monitoring received signals at said one or more first pre-defined time instances from one or more of said one or more neighboring network nodes and, in response to, while performing the monitoring, receiving one or more reference signals at said one or more first pre-defined time instances, measuring signal quality of said one or more reference signals; and
- in response to a received first or second command comprising a command to interrupt transmitting of all backhauling signals at said one or more first pre-defined time instances, interrupting transmitting of all backhauling signals at said one or more first pre-defined time instances, wherein the means are configured to produce a plurality of beams for transmission and reception and one or more of the transmitting and the monitoring of the reference signal are performed beam-specifically.

14. The network node according to claim 13, wherein the means are further configured to perform:
in response to receiving, from the control node, the second command to monitor received signals at said one or more first pre-defined time instances to measure the reference signal and further to transmit measurement results of each received reference signal to the control node, monitoring received signals at said one or more first pre-defined time instances from one or more of said one or more neighboring network nodes and, in response to, while performing the monitoring, receiving said one or more reference signals at said one or more first pre-defined time instances, measuring signal quality of said one or more reference signals and transmitting measurement results of said one or more reference signals to the control node.

15. The network node according to claim 13, wherein the means are further configured to transmit the measurement results of said one or more reference signals as radio resource control, RRC, signals and/or to receive and/or transmit said one or more reference signals as one or more of the following: a synchronization signal block, a channel state information reference signal, a sounding reference signal, a physical downlink control channel signal and a physical uplink control channel signal.

16. The network node according to claim 13, wherein the means comprise:
at least one processor; and
at least one memory including computer program code, said at least one memory and computer program code configured to, with said at least one processor, cause the performance of the network node.

17. A method comprising:
maintaining, in a database, information on one or more neighboring network nodes with which a network node is able to form a wireless backhauling link but with which no wireless backhauling link is currently formed, wherein the network node is a donor access node or a relay node of a wireless backhaul network;
transmitting and receiving backhauling signals in the wireless backhaul network following a transmission/reception time pattern;
in response to receiving, from a control node, a first command to transmit a reference signal at one or more first pre-defined time instances, transmitting the reference signal at said one or more first pre-defined time instances to one or more of said one or more neighboring network nodes;
in response to receiving, from the control node, a second command to monitor received signals at said one or more first pre-defined time instances to measure the reference signal, monitoring received signals at said one or more first pre-defined time instances from one or more of said one or more neighboring network nodes and, in response to, while performing the monitoring, receiving one or more reference signals at said one or more first pre-defined time instances, measuring signal quality of said one or more reference signals; and
in response to a received first or second command comprising a command to interrupt transmitting of all backhauling signals at said one or more first pre-defined time instances, interrupting transmitting of all backhauling signals at said one or more first pre-defined time instances, wherein one or more of the transmitting and the monitoring of the reference signal are performed beam-specifically using one or more of a plurality of beams for transmission and reception.

18. A computer program embodied on a non-transitory computer-readable medium, said computer program comprising instructions which, when run on a processor, control the processor to perform:
maintaining, in a database, information on one or more neighboring network nodes with which a network node is able to form a wireless backhauling link but with which no wireless backhauling link is currently formed, wherein the network node is a donor access node or a relay node of a wireless backhaul network;
causing transmitting and receiving backhauling signals in the wireless backhaul network following a transmission/reception time pattern;
in response to receiving, from a control node, a first command to transmit a reference signal at one or more first pre-defined time instances, causing transmitting the reference signal at said one or more first pre-defined time instances to one or more of said one or more neighboring network nodes; and
in response to receiving, from the control node, a second command to monitor received signals at said one or more first pre-defined time instances to measure the reference signal, monitoring received signals at said one or more first pre-defined time instances from one or more of said one or more neighboring network nodes and, in response to, while performing the monitoring, receiving one or more reference signals at said one or more first pre-defined time instances, measuring signal quality of said one or more reference signals; and
in response to a received first or second command comprising a command to interrupt transmitting of all backhauling signals at said one or more first pre-defined time instances, interrupting transmitting of all backhauling signals at said one or more first pre-defined time instances, wherein one or more of the transmitting and the monitoring of the reference signal are performed beam-specifically using one or more of a plurality of beams for transmission and reception.

* * * * *